United States Patent
Cosby et al.

(10) Patent No.: US 7,305,419 B1
(45) Date of Patent: Dec. 4, 2007

(54) HIERARCHICAL REFERENCE DATA MANAGEMENT SYSTEM AND METHOD

(75) Inventors: Douglas Cosby, Austin, TX (US);
Byron McKenzie, Garland, TX (US);
Jack Smiley, The Colony, TX (US)

(73) Assignee: Hyperion Solutions Corporation, Santa Clara, CA (US)

( * ) Notice: Subject to any disclaimer, the term of this patent is extended or adjusted under 35 U.S.C. 154(b) by 414 days.

(21) Appl. No.: 10/809,056

(22) Filed: Mar. 25, 2004

Related U.S. Application Data

(60) Provisional application No. 60/457,185, filed on Mar. 25, 2003.

(51) Int. Cl.
*G06F 12/00* (2006.01)
(52) U.S. Cl. .................... 707/200; 707/100; 705/1
(58) Field of Classification Search ............ 707/10, 707/100, 200, 201, 203; 711/117, 122; 705/1, 705/28
See application file for complete search history.

(56) References Cited

U.S. PATENT DOCUMENTS

| | | | | |
|---|---|---|---|---|
| 5,386,559 A | * | 1/1995 | Eisenberg et al. | 707/201 |
| 5,459,863 A | * | 10/1995 | Taylor | 707/10 |
| 5,600,832 A | * | 2/1997 | Eisenberg et al. | 707/203 |
| 6,216,140 B1 | * | 4/2001 | Kramer | 715/511 |

* cited by examiner

*Primary Examiner*—Greta Robinson
(74) *Attorney, Agent, or Firm*—Hickman Palermo Truong & Becker LLP

(57) ABSTRACT

Embodiments of the present invention provide systems and methods of managing hierarchical reference data. According to one embodiment of the present invention, a hierarchical data management program can maintain a master set of reference data corresponding to the reference data being managed. From the master set of reference data, the hierarchy management program can instantiate centralized hierarchies, validate changes to the centralized hierarchies and enforce business rules with respect to the centralized hierarchies. The hierarchy management program can publish the centralized hierarchies to subscribing systems for use by the subscribing systems in managing data of interest.

50 Claims, 19 Drawing Sheets

FIGURE 2

| AreaCode | Area |
|---|---|
| 1 | Asia |
| 2 | Europe |
| 3 | Joint Venture |
| 4 | United States |

314

| Region | RegionName | Area |
|---|---|---|
| 1 | AsiaSE | 1 |
| 2 | AsiaSW | 1 |
| 3 | EasternEurope | 2 |
| 4 | Western Europe | 2 |

316

| CountryID | CountryName | Region |
|---|---|---|
| 1 | China | 1 |
| 2 | England | 3 |

HIERARCHICAL REFERENCE DATA MANAGEMENT SYSTEM AND METHOD

RELATED APPLICATIONS

This Application claims priority under 35 U.S.C. §119(e) to U.S. Provisional Patent Application No. 60/457,185, entitled "System and Method for Data Management" filed Mar. 25, 2003, the contents of which are fully incorporated by reference herein.

TECHNICAL FIELD OF THE INVENTION

The present invention relates generally to the field of data management. More particularly, the present invention relates to systems and methods of managing hierarchical reference data.

BACKGROUND

Many organizations store financial data, manufacturing data and other critical data in databases or other electronic storage formats. For purposes of understanding the data, the data must be reported in some form that makes sense to human or programmatic users. In other words, users typically want to see quantitative information "by" some criteria. For example, a user may want to see sales in dollars by month, by cost center, by region and so on. The data used to enforce the criteria is referred to as reference data. Oftentimes, individual pieces of reference data are interrelated in some manner. For example, the piece of reference data representing a cost center can be related to the piece of reference data representing a geographical region. The organization of the reference data to reflect these relationships is referred to as its hierarchy.

A single organization can have multiple systems for storing and reporting data. Often, these systems are heterogeneous, with each system having its own hierarchy or hierarchies for reference data. FIG. 1 is a diagrammatic representation of a prior art system for storing and reporting data. In FIG. 1, system 100 can include an accounting system 102 having hierarchy 104 for organizing data in database 106 and electronic transaction system 108 having hierarchy 110 for organizing data in database 107. Each hierarchy can organize different or overlapping sets of reference data according to different criteria. For example, hierarchy 104 can organize data of interest according to the corporate organization, with the reference data indicating the department, the section and the cost center associated with the piece of data. Hierarchy 110, on the other hand, can organize the data geographically according to continent, country region and cost center. Typically a system using a particular hierarchy, such as hierarchy 104, will have no knowledge of the hierarchies employed by other systems, even if a portion of the reference data overlaps.

To further complicate matters, other systems that use the data may have their own hierarchies for reporting the data. A financial reporting system 114, for example, can have its own hierarchy 116 to organize data imported from accounting system 102 or transaction system 108 into reports for users. Reporting hierarchy 116 can require, for example, that data be accessed based on country and department, requiring coordination of hierarchy 104 and hierarchy 110 to access data. An Extract Transform Load ("ETL") system 118 can map data from accounting system 102, electronic transaction system 108 and other systems to financial reporting system 114.

Current systems suffer several shortcomings in managing multiple hierarchies, particularly when the hierarchies change. Suppose local users in an organization decide to add an additional cost center for the purposes of tracking electronic transactions. In this case, hierarchy 110 can be updated to associate the new cost center with particular pieces of transaction data. However, since accounting system 102 does not have knowledge of hierarchy 110, the update to hierarchy 110 will not change hierarchy 104, meaning that accounting system 102 and electronic transaction system 108 are tracking transactions according to a different set of cost centers. While this is just one example of change in one hierarchy that should be reflected in another hierarchy, there may be a great many changes due to new cost centers being added, products changing product lines or names, revised accounting standards or other circumstances that require changes to be propagated to multiple hierarchies, particularly in a large organization.

Management of hierarchy changes in prior art systems was often handled manually. Continuing with the example above, an administrator of electronic transaction system 108 would notify an administrator of accounting system 102 via email or other communication of the addition of the new cost center to hierarchy 110 and the second administrator will try to update hierarchy 104 accordingly. Additionally, the mappings of ETL system 118 could then be updated, typically through implementation of custom code, so that the augmented hierarchies 110 and 104 could be mapped to hierarchy 116. When a large number of changes are made to hierarchies, updating other hierarchies and mappings becomes an increasingly time consuming and error prone process.

Another shortcoming of many prior art systems is the lack of effective management of business rules across hierarchies. Often, knowledge of business rules is owned at a departmental or individual user level. The rules can be buried in hard-coded system interfaces, spreadsheets and desktop databases. Consequently, a particular user or set of users may not have knowledge of various business rules implicated for a particular hierarchy change. From the perspective of business transaction system 108, the addition of a cost center may not be restricted, however, from the perspective of accounting system 102, a business rule may exist that new cost centers should not be added for regulatory reasons. Therefore, while a new cost center can be added to hierarchy 110, the same cost center can not be added to hierarchy 104, leading to a discrepancy between cost centers used by different hierarchies. Such discrepancies across hierarchies can cause minor inconvenience or lead to significant errors in financial and regulatory reporting.

SUMMARY OF THE DISCLOSURE

Embodiments of the present invention provide systems and methods of data management that eliminate, or at least substantially reduce, the shortcomings of prior art data management systems.

One embodiment of the present invention can include a computer program product comprising a set of computer instructions stored on a computer readable storage medium. The set of computer instructions can include instructions executable to maintain a master set of hierarchical reference data, wherein the master set of hierarchical reference data represents reference data from hierarchies for multiple subscribing systems, receive a change to a first centralized hierarchy, determine additional centralized hierarchies affected by the change, instantiate the additional centralized hierarchies reflecting the change and validate the change in the first centralized hierarchy and the additional centralized hierarchies.

The set of computer instructions can be further executable to instantiate multiple reference data hierarchies according to a hierarchy object model. The hierarchy object model can include a global node representing a piece of reference data across the multiple hierarchies and at least one local node corresponding to the global node, wherein each local node represents the piece of reference data in a particular hierarchy.

Another embodiment of the present invention can include a system for managing hierarchical reference data comprising a processor, a computer readable storage medium accessible by the processor and a set of computer instructions stored on the computer readable storage medium. The computer instructions can be executable to maintain a master set of hierarchical reference data, wherein the master set of hierarchical reference data represents reference data from hierarchies for multiple subscribing systems, receive a change to a first centralized hierarchy, determine additional centralized hierarchies affected by the change, instantiate the additional centralized hierarchies reflecting the change, and validate the change in the first centralized hierarchy and the additional centralized hierarchies. The set of computer instructions can further comprise instructions executable to represent multiple reference data hierarchies according to a hierarchy object model. The hierarchy object model includes a global node representing a piece of reference data across the multiple hierarchies and at least one local node corresponding to the global node, wherein each local node represents the piece of reference data in a particular hierarchy.

Yet another embodiment of the present invention can comprise a method of representing multiple hierarchies, comprising maintaining a master set of hierarchical reference data, wherein the master set of hierarchical reference data represents reference data from hierarchies for multiple subscribing systems, receiving a change to a first centralized hierarchy, determining additional centralized hierarchies affected by the change, instantiating the additional centralized hierarchies reflecting the change and validating the change in the first centralized hierarchy and the additional centralized hierarchies.

Embodiments of the present invention provide an advantage over prior art data management systems by allowing inherencies to be enforced within a hierarchy and across hierarchies.

Embodiments of the present invention provide another advantage over prior art data management systems by being able to automatically apply business rules and validations across multiple hierarchies.

Embodiments of the present invention provide yet another advantage over prior art data management system by automatically propagating hierarchy changes across multiple hierarchies.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 3A and FIG. 3B are diagrammatic representations of example data that can be represented hierarchically;

DETAILED DESCRIPTION

Figure 1:
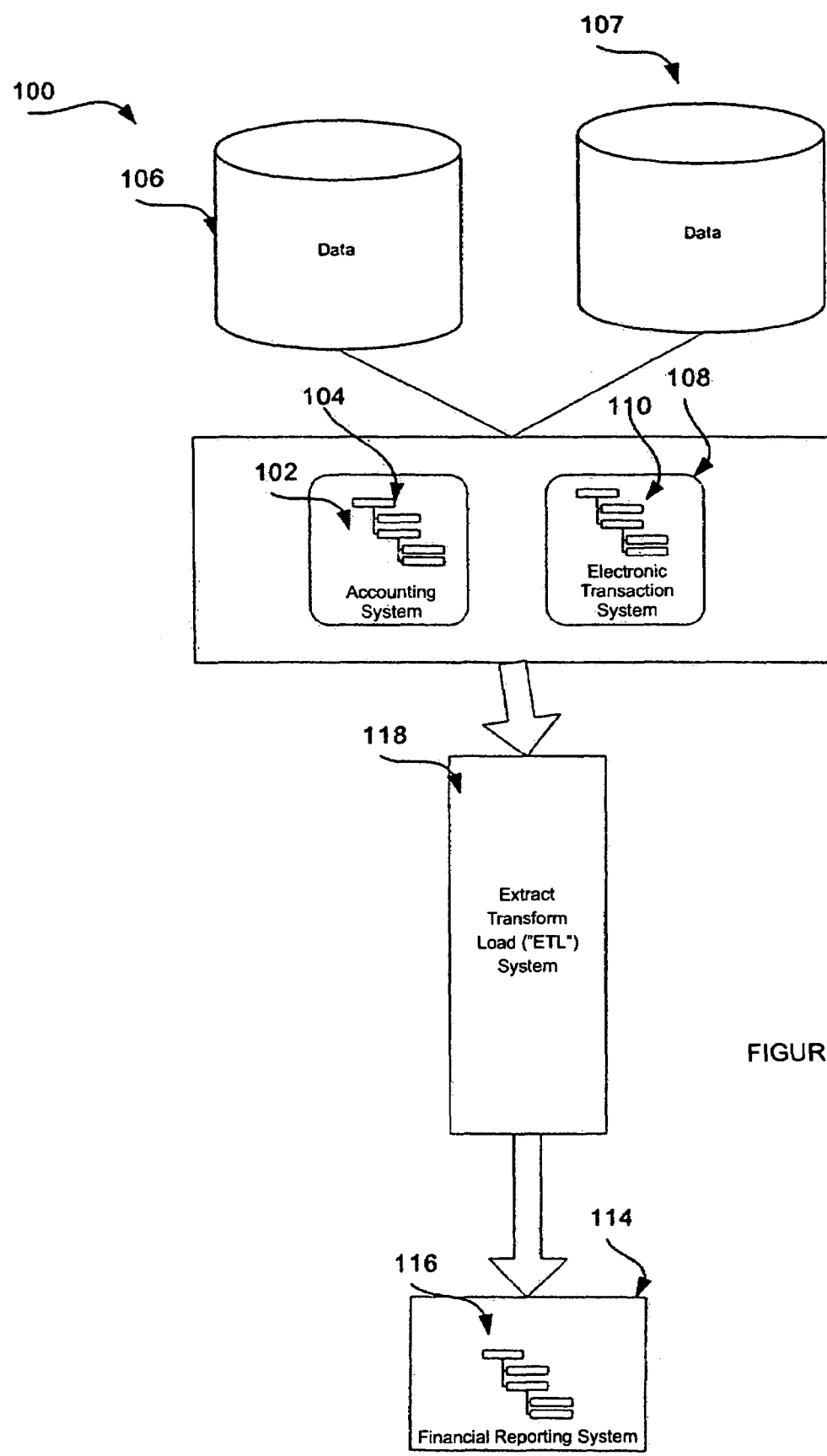
FIG. 1 is a diagrammatic representation of an embodiment of prior art system.

Preferred embodiments of the invention are illustrated in the FIGURES, like numerals being used to refer to like and corresponding parts of the various drawings.

For purposes of this application, "reference data" is descriptive information about data, including data characteristics, business characteristics or other characteristic descriptive of the underlying data used by an application, model, simulation, reporting system or other programmatic user of the data to access or store the data. In other words, reference data is data used to categorize data in a database or other data storage format or for relating the data to information outside of the database. In a corporate enterprise, reference data includes, by way of example, but not limitation, currency codes, country codes, cost center codes, product lines, product numbers, and others. This type of data is often used to organize and access other kinds of data in the database for purposes of reporting data. The particular reference data for a given enterprise can be arbitrarily defined based on the needs of the enterprise. A "piece of reference data" is a reference data instance. A piece of reference data can be associated with various other arbitrarily defined attributes according to a particular implementation. A hierarchy is a model for defining the relationships between pieces of reference data. Hierarchies are also referred to as dimensions. At the top of the hierarchy is a "root" element that can contain many sub-elements. If a sub-element contains additional sub-elements it is a limb, whereas if the sub-element does not contain additional sub-elements it is a leaf. "Hierarchical reference data" is reference data organized in a hierarchy such that a piece of hierarchical reference data has a parent or a child. "Data of interest" is the data that the reference data in a particular branch of a hierarchy defines. A "subscribing system" is a software program or system for which hierarchies are managed. A "centralized hierarchy" is a hierarchy instantiated or maintained to manage the hierarchy of a subscribing system.

Embodiments of the present invention provide systems and methods of managing reference data. According to one embodiment of the present invention, a hierarchical data management program can maintain a master set of reference data corresponding to the reference data being managed. From the master set of reference data, the hierarchy management program can instantiate centralized hierarchies, validate changes to the centralized hierarchies and enforce business rules with respect to the centralized hierarchies. The hierarchy management program can publish the centralized hierarchies to subscribing systems for use by the subscribing systems in managing data of interest. The hierarchy management program, according to one embodiment of the present invention, can maintain a hierarchy object model that can be applied to the master set of reference data to instantiate one or more centralized hierarchies. The hierarchy object model can include global nodes which represent pieces of reference data, their associated properties and relationships across multiple hierarchies and local nodes that represent the pieces of reference data, their properties and relationships with respect to particular hierarchies. The global nodes, can act as an abstractions of corresponding local nodes across hierarchies. Through the use of global nodes and local nodes, embodiments of the present invention can enforce relationships between properties in a particular hierarchy and across hierarchies. Additionally, business rules, validations and other process can be easily applied across hierarchies.

Figure 2:
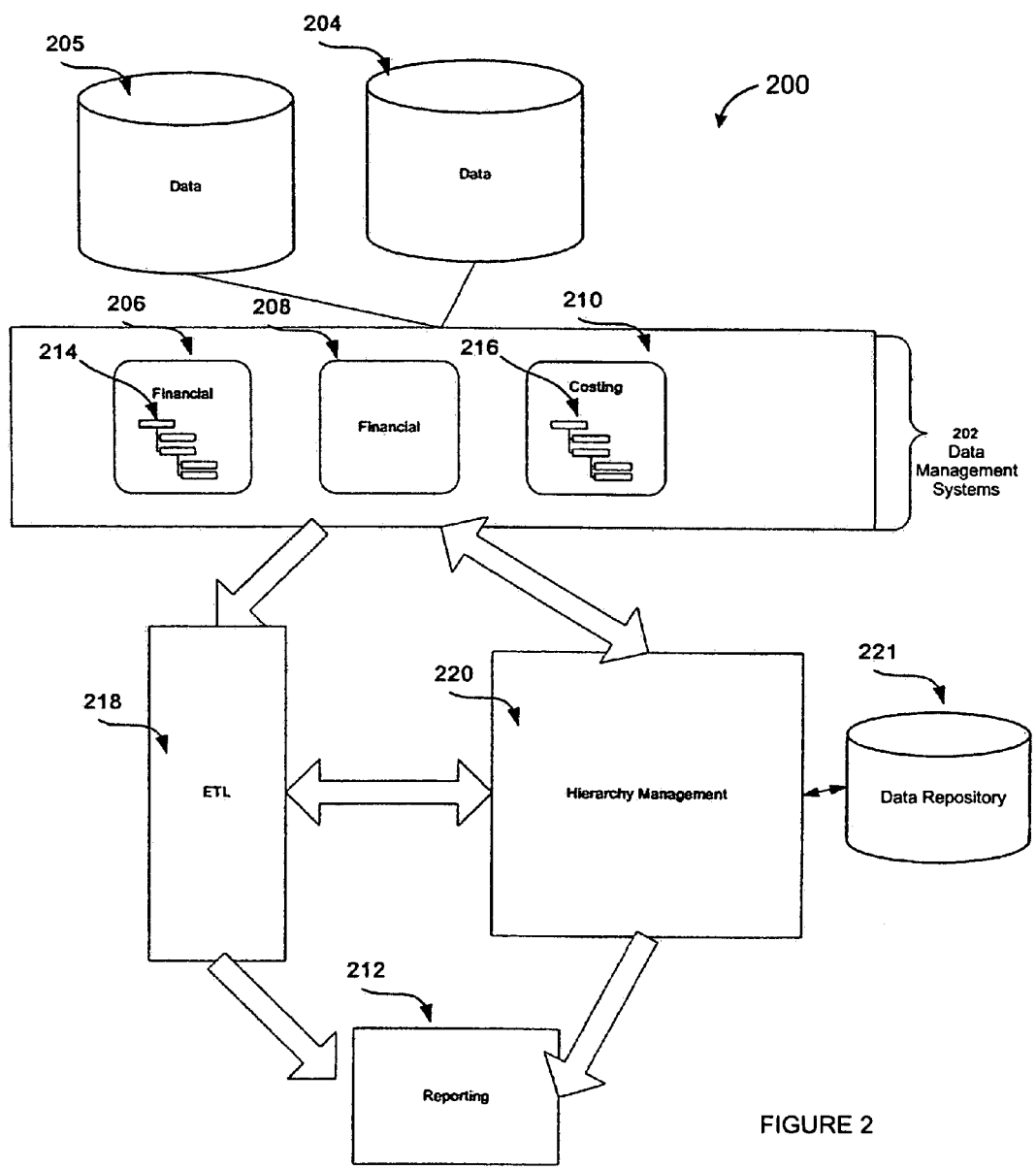
FIG. 2 is a diagrammatic representation of one embodiment of a software architecture for an enterprise that can employ hierarchy management according to the present invention.

FIG. 2 is a diagrammatic representation of a software architecture 200 for an enterprise in which management of hierarchical reference data can be implemented according to embodiments of the present invention. Architecture 200 can include data management systems 202 for entering and accessing data in one or more databases, such as database 204 and database 205 (e.g., Microsoft SQLServer, Oracle, Sybase, ODBC or other database known in the art). Data Management systems 202 can include, by way of example, but not limitation, financial data systems (e.g., financial data system 206, financial data system 208), costing systems (e.g., costing system 210), electronic transaction systems and other systems known in the art (e.g., SAP, JD Edwards, PeopleSoft, Oracle Financials, Lawson and other systems). Additionally, architecture 200 can include reporting system 212 to report data to human or programmatic users. Each of financial data system 206, financial data system 208, costing system 210 and reporting system 212 can use its own hierarchy of reference data to store, access or report on data of interest from database 204. System 200 can further include an ETL system 218 to extract data from data management systems 202 and format the data to the hierarchy of reporting system 212.

By way of example financial data system 206 can be a financial data system implemented in a corporate enterprise to track expenses based on line of business ("LOB"), whereas costing system 210 can configured to track expenses based on geography. In this example, hierarchy 214, used by financial data system 206 to organize particular expenses, can include reference data related to the LOB structure of the firm (e.g., related to departments, divisions, sections and so on) while hierarchy 216 used by costing system 210 to organize data can include reference data related to the geographical location at which particular expenses occur. While some pieces of reference data may overlap between the two hierarchies, financial data system 206 may have little or no knowledge about hierarchy 216 and costing system 210 may have little or no knowledge about hierarchy 214.

Architecture 200 can include a hierarchy management program 220 to manage the multiple hierarchies of architecture 200. Hierarchy management program 220 can maintain a master set of reference data in a data repository 221 representing the hierarchical reference data used by source data management systems 202. Hierarchy management program 220 can, from the master set of reference data, instantiate centralized hierarchies and publish the centralized hierarchies to systems 202. Centralized hierarchies can be maintained, analyzed and validated before being sent to subscribing systems. As will be discussed in conjunction with FIGS. 9-10, hierarchy management program 220 can formalize hierarchy management, according to one embodiment of the present invention, by maintaining a hierarchy object model for hierarchy management. The hierarchy object model can include representations of reference data across hierarchies (referred to "global nodes") and representations of the reference data in a particular hierarchy (refereed to as a "local nodes"). The hierarchy object model can associate properties with particular pieces of reference data and can enforce inherencies between properties across different levels of a hierarchy and across hierarchies.

Hierarchy management program 220 can serve as the "system of record" for hierarchical reference data, can reconcile hierarchical reference data from source data management systems 202. Hierarchy management program 220 can publish hierarchical reference data for loading into selected systems and can load hierarchical reference data from systems for audit and validation purposes. The system in a particular enterprise software architecture to which the hierarchy management program can publish data or from which the hierarchy management program can load data can be defined to suit the particular needs of the enterprise.

Figure 3A:
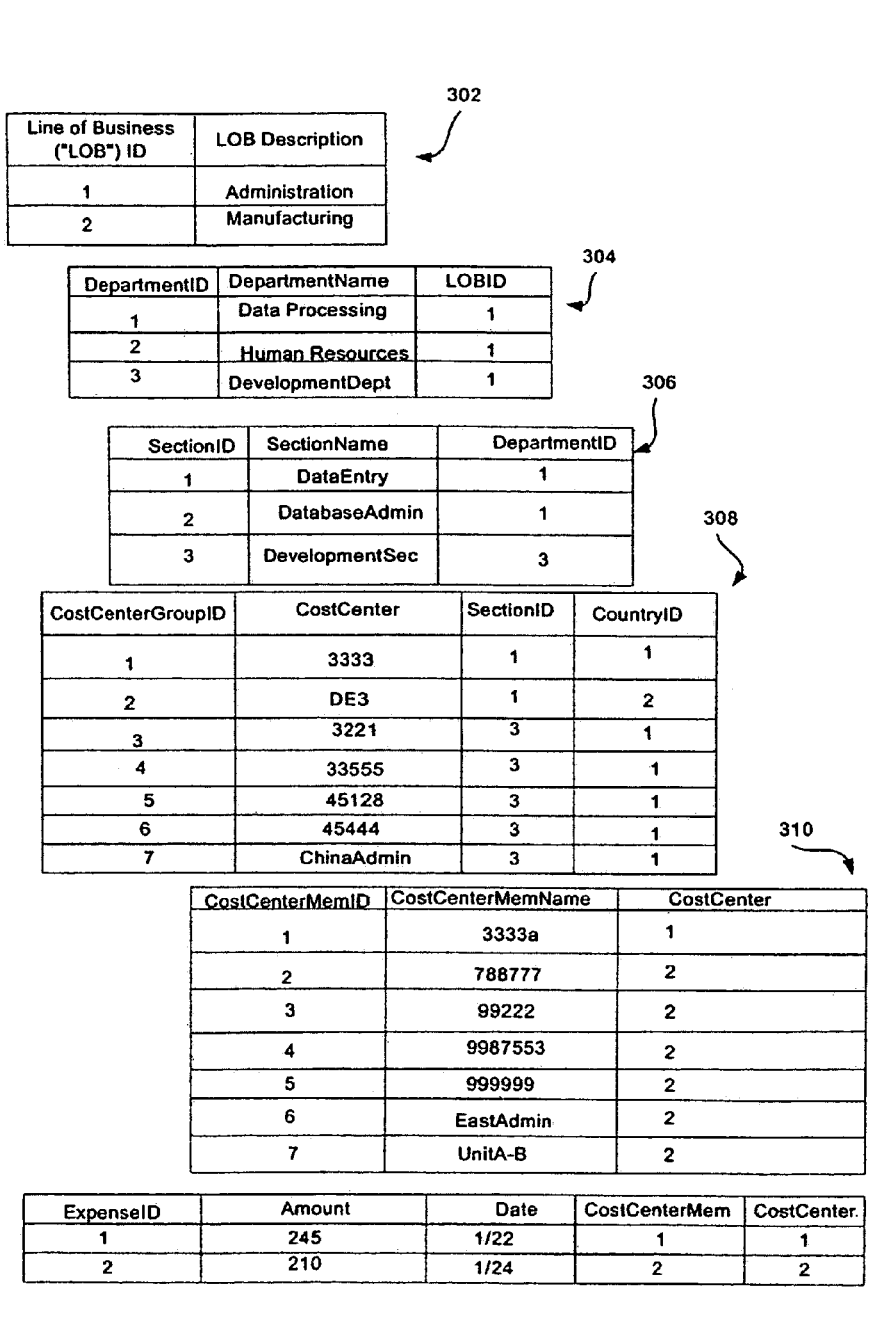

FIGS. 3A and 3B illustrate examples of reference data that can be managed by a hierarchy management program according to one embodiment of the present invention. For the sake of simplicity, various pieces of reference data are shown, but associated properties are omitted. In the examples of FIGS. 3A and 3B, it is assumed that a set of line of business ("LOB") data is used in one hierarchy to reference data of interest geographical data is used to reference data of interest in the other hierarchy.

FIG. 3A provides an example for organizing line of business data for an organization in a database. The database can include an LOB root table 302 indicated that the organization implementing the system has two lines of business: Administration and Manufacturing. Department table 304 indicates that the Administration LOB includes Data Processing, Human Resources and Development departments. Section table 306 indicates that the Data Processing Department includes Data Entry, Database Administration and Development sections. Cost Center table 308 indicates that the Data Entry section includes Cost Centers "3333", "DE", "3221", "33555", "45128", "45444" and "ChinaAdmin". Cost Center Member table 310 indicates that Cost Center "3333" includes Cost Center "3333a" and Cost Center "DE" includes Cost Center Members "788777", "99222", "9987533", "999999", "East Admin" and "UnitA-B." Finally, transaction data table 312 indicates that an expense of $245 occurred on 1/22 at the cost center member "3333a" of cost center "3333" and an expense of $210 occurred on 1/24 at cost center member "788777" of cost center "DE3".

FIG. 3B provides an example of database tables for geographic information. Area table 314 indicates three defined areas "Asia", "Europe", "Joint Ventures" and "United States". Region table indicates that Asia is further divided into Southwest Asia and Southeast Asia and Europe is divided into Western Europe and Eastern Europe. Country table 316 indicates that China is in the South Eastern Asia region and England is in the Western Europe Region. Returning to FIG. 3A, transaction Table 312 indicates that a $245 transaction occurred on 1/22 in a Chinese cost center and a $210 transaction occurred on 1/24 at an English Cost Center.

Figure 4A:
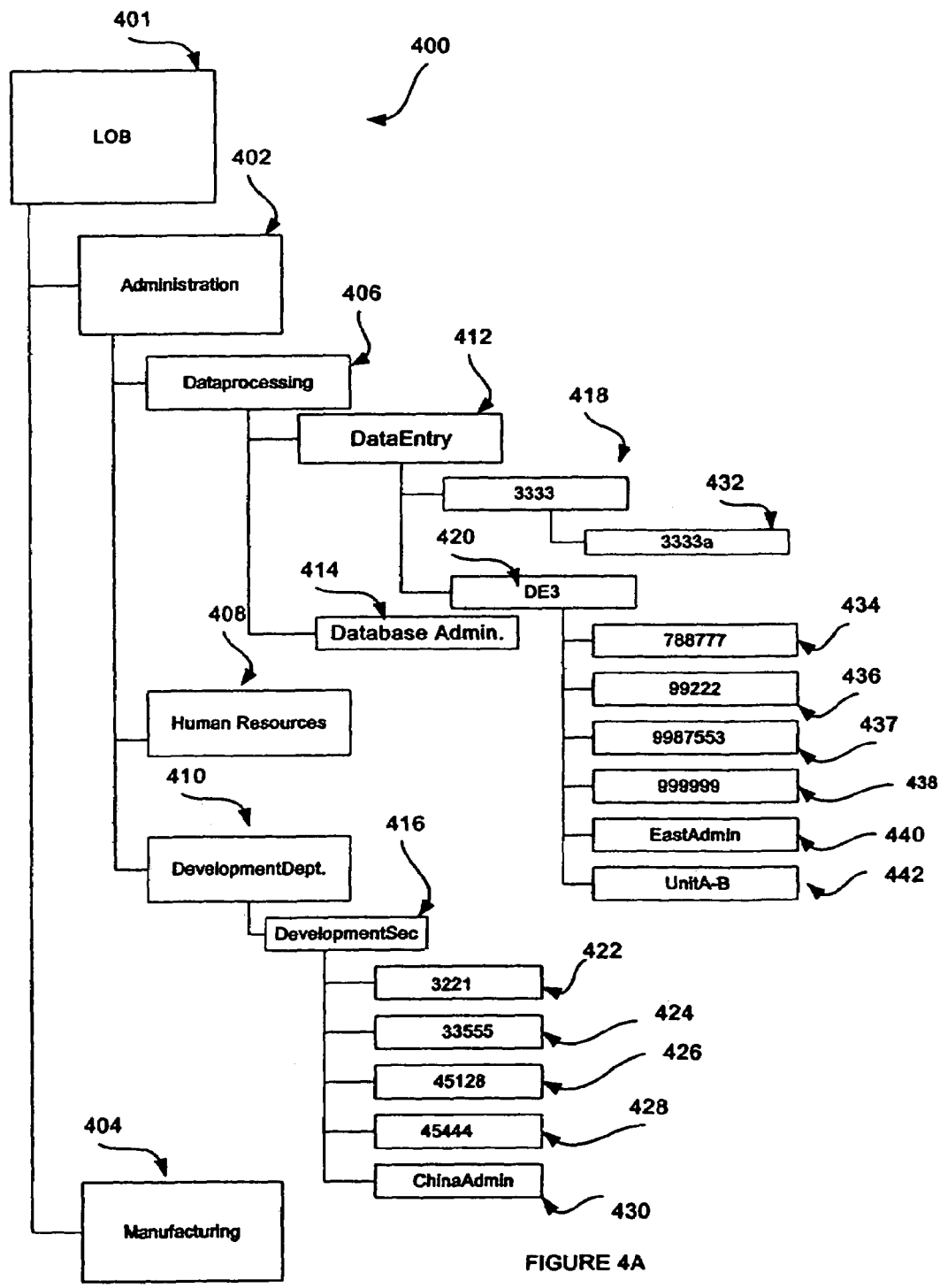
FIG. 4A and FIG. 4B are diagrammatic representations of example hierarchies based on the data in FIGS. 3A and 3B.

FIG. 4A is a diagrammatic representation of a line of business hierarchy 400 based on the reference data in the example tables of FIG. 3A. Hierarchy 400 can include a root 401 for the LOB hierarchy and branch 402 representing "Administration" branch 404 representing "Manufacturing" from table 302. Hierarchy 400 can further include branch 406 for the "Data Processing" department, branch 408 for "Human Resources" department and branch 410 for "Development" department from table 304. To represent sections, hierarchy 400 can include branch 412 for "Data Entry", branch 414 for "Database Admin" and branch 416 for "DevelopmentSec". For the cost centers, hierarchy 400 can include branch 418 for the "3333" cost center branch 420 for the "DE3" cost center, leaf 422 for the "3221" cost center, leaf 424 for the "33555" cost center, leaf 426 for the "45128" cost center, leaf 428 for the "45444" cost center and leaf 430 for the "ChinaAdmin" cost center. Finally, for the cost center members, hierarchy 400 can include leaf 432 for the "3333a" cost center member, leaf 434 for the "788777" cost center member, leaf 436 for the "99222" cost center member, leaf 437 for the "9987553" cost center member, leaf 438 for the "999999" cost center member, leaf 440 for the "EastAdmin" cost center member and leaf 442 for the "UnitA-B" cost center member. Since the financial system organizes information solely according to LOB, in this example, geographical information is not used as reference data in hierarchy 400.

Figure 4B:
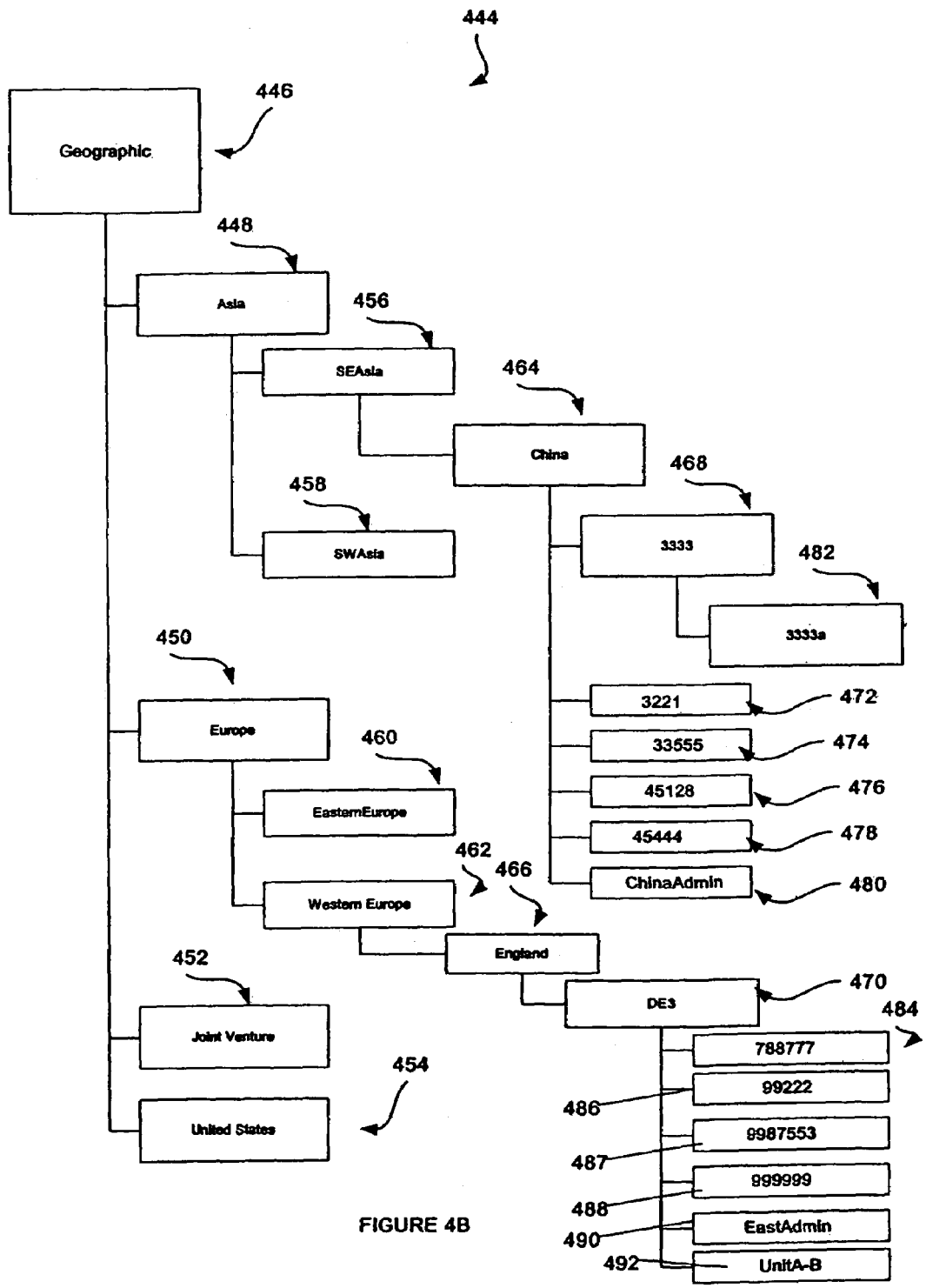

FIG. 4B, on the other hand, is a diagrammatic representation of a geographical hierarchy 444 based on the reference data in FIGS. 3A and 3B. Geographical hierarchy 444 can include a root 446 for geographical hierarchy 444 and branch 448 representing the "Asia" area, branch 450 representing the European region, branch 452 representing the defined "Joint Venture" region, and branch 454 representing the "United States" region. Branches 456 and 458 can represent the "SEAsia" region and the "SWAsia" region, respectively, while branches 460 and 462 can represent the "Eastern Europe" and "Western Europe" respectively. With respect to countries, branch 464 can represent China and branch 466 can represent England. For the cost centers, hierarchy 444 can include branch 468 for the "3333" cost center branch 470 for the "DE3" cost center, leaf 472 for the "3221" cost center, leaf 474 for the "33555" cost center, leaf 476 for the "45128" cost center, leaf 478 for the "45444" cost center and leaf 480 for the "ChinaAdmin" cost center. Finally, for the cost center members, hierarchy 444 can include leaf 482 for the "3333a" cost center member, leaf 484 for the "788777" cost center member, leaf 486 for the "99222" cost center member, leaf 487 for the "9987553" cost center member, leaf 488 for the "999999" cost center member, leaf 490 for the "EastAdmin" cost center member and leaf 492 for the "UnitA-B" cost center member.

Hierarchy 400 and hierarchy 444 represent the organization of reference data used by the application implementing the hierarchy to define a piece of data of interest. A program implementing hierarchy 400, by way of example, can find the value of all transactions occurring in Data Entry Section (e.g., $455), whereas a program implementing hierarchy 444 can find the value of all expenses from Chinese cost centers (e.g., $245). Thus, each hierarchy provides a different way to define the data of interest. It should be noted that the hierarchies of FIGS. 4A and 4B and the database tables of FIGS. 3A and 3B are provided by way of example only and it should be understood that embodiments of the present invention are applicable to managing arbitrarily complex hierarchies.

Figure 5:
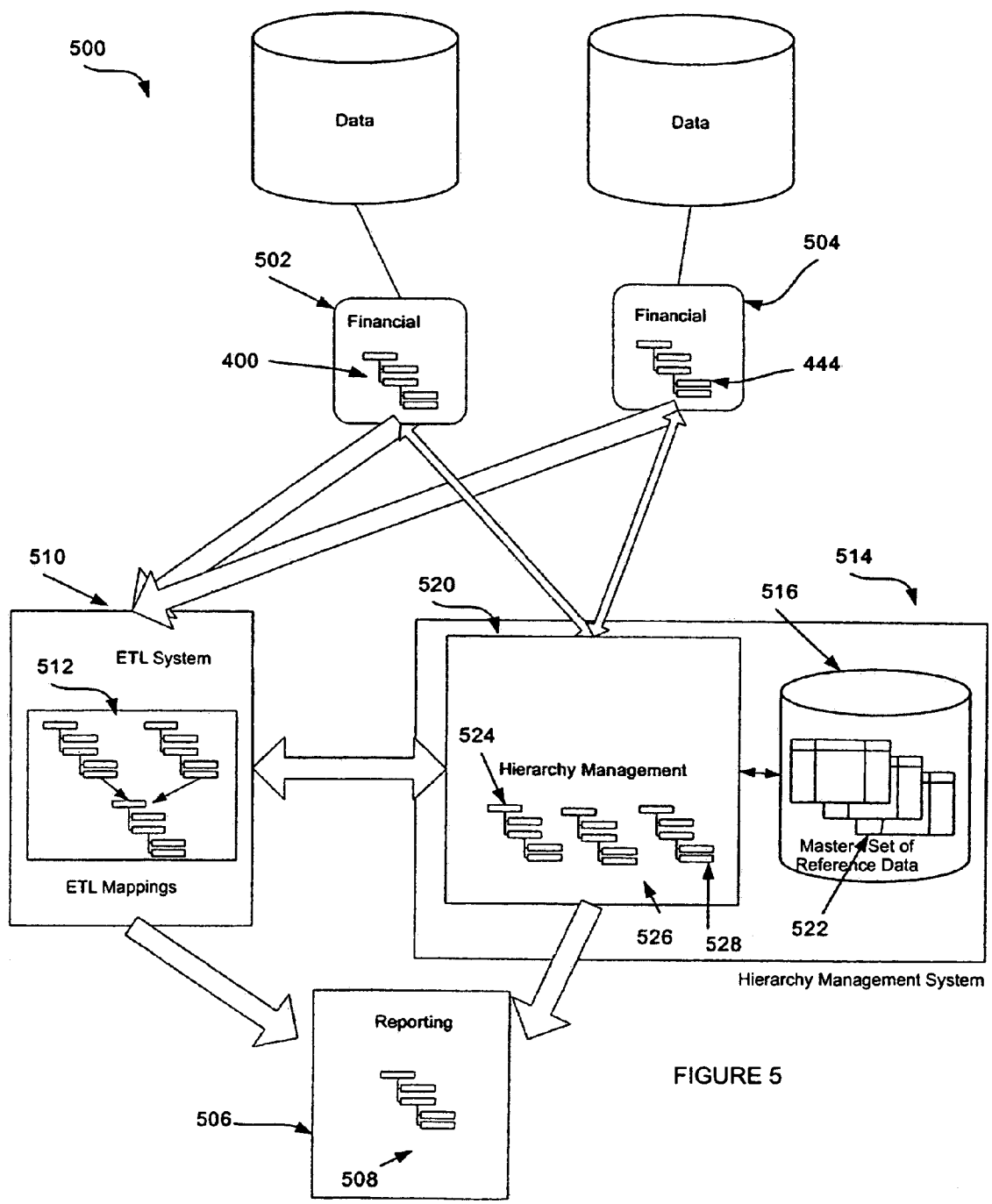
FIG. 5 is a diagrammatic representation of another embodiment of an enterprise system that can employ hierarchy management according to one embodiment of the present invention.

FIG. 5 is a diagrammatic representation of a system for centralized hierarchy management for an enterprise 500 according to one embodiment of the present invention, using the example hierarchies of FIGS. 4A and 4B. Enterprise 500 can include a financial system 502 using line of business hierarchy 400 and a financial system 504 using geographic hierarchy 444. Enterprise 500 can further include a reporting system 506 using a consolidated hierarchy 508 to report data based on line of business and geographic location. An ETL application 51b, such as an Informatica PowerCenter Solution (Informatica and PowerCenter are trademarks of Informatica Corporation of Redwood City, Calif.), can map the reference data in business hierarchy 400 and geographic hierarchy 444 to consolidated hierarchy 508 using ETL mappings 512. ETL application 510 can map hierarchy 400 and hierarchy 444 to hierarchy 508 using any ETL mapping scheme known in the art.

According to one embodiment of the present invention, financial system 502 will have no knowledge of geographic hierarchy 444 and financial system 504 will have no knowledge of line of business hierarchy 444. However, it may be the case that changes to one hierarchy should be reflected in another hierarchy. For example, suppose a new cost center ("NewCost") is added under the "DE3" Cost Center Group in geographic hierarchy 444. Since the "DE3" Cost Center Group also appears in hierarchy 400, this change should be reflected in hierarchy 400 as well. Additionally, ETL mappings 512 and consolidated hierarchy 508 should be updated to reflect this change.

In most prior art systems, the administrator of financial system 504 would notify the administrator of financial system 502 of the hierarchy change so that hierarchy 400 could be independently updated. The change to hierarchy 400 could then be validated against the business rules associated with hierarchy 400. If change to hierarchy 400 is invalid, the administrator of financial system 502 would have to inform the administrator of financial system 504 that the additional cost center should not be added. Additionally, an administrator would have to independently update ETL mappings 512 and consolidated hierarchy 508 to account for changes in underlying hierarchies. Thus, a relatively simple business change (i.e., adding a cost center to one hierarchy) would typically require IT intensive updates to multiple systems across the enterprise. Moreover, validation of hierarchies against business rules would have to occur on a hierarchy by hierarchy basis at individual systems.

According to one embodiment of the present invention, enterprise 500 can include a hierarchy management system 514 that includes a database 516 (or other data storage system known in the art) and a hierarchy management program 520. Database 516 can include a master set of reference data 522. Master set of reference data 522 can include a copy of all the pieces of reference data being managed by hierarchy management system 514. Thus master set of reference data 522 can maintain copies of data for hierarchy 400, hierarchy 444 and hierarchy 508. Duplicate copies of particular pieces of reference data can be maintained in master set of reference data or a single copy of a piece of reference data that appears in multiple hierarchies can be maintained. For example, a single copy of the "DE3" piece of reference data can be maintained for both hierarchy 400 and hierarchy 444, or a copy can be maintained for each hierarchy. Additionally, properties associated with each piece of reference data, the relationships between pieces of reference data for various hierarchies, business rules and other arbitrarily defined rules that apply to each hierarchy can be maintained by hierarchy management system 514. Thus, hierarchy management system 514 can act as the "system of record" for enterprise 500.

Hierarchy management program 520 can pull data from and push data to the subscribing systems (e.g., financial system 502, financial system 504, reporting system 506, and ETL system 510). Hierarchies can be published to subscribing systems in readily loadable formats specific to the particular subscribing system. As an example, if hierarchy 400 is established at financial system 502, the hierarchy will include pieces of reference data, associated properties and relationships. Hierarchy management program can import the reference data, the properties and the relationships. Using the example of the "DE3" piece of reference data from hierarchy 400, hierarchy management program 520 can import the piece of reference data, the name of the parent piece of reference data "DataEntry" and the names of the children pieces of reference data "788777", "99222", "9987553", "999999", "EastAdmin" and "UnitA-B". Additionally, hierarchy management program 520 can import any properties associated with the "DE3" piece of reference data. By storing pieces of reference data, relationships and properties, for each hierarchy being managed, hierarchy management program 520 can maintain a master set of reference data. From the master set of reference data, the hierarchy management program 520 can instantiate centralized hierarchies such as hierarchy 524, corresponding to hierarchy 400, hierarchy 526, corresponding to hierarchy 444 and hierarchy 528 corresponding to hierarchy 508. Centralized hierarchies can be used to manage the hierarchies of subscribing systems.

Because hierarchy management program 520 can instantiate centralized hierarchies from a master set of reference data representing multiple hierarchies of subscribing systems, changes to particular hierarchies can be propagated to other hierarchies and can be validated across hierarchies. Returning to the example of adding a "NewCost" cost center to the "DE3" cost center group in hierarchy 444, the new cost center can be added to hierarchy 444 at financial system 504. This change can be imported by hierarchy management program 520 to the master set of reference data. The change can include the "NewCost" piece of reference data, the parent name "DE3" and any associated properties. Based on the relationship between the "NewCost" piece of reference data and the "DE3" piece of reference data, hierarchy management program 520 can add a "NewCost" piece of reference data to centralized hierarchy 528 and apply arbitrarily defined rules to hierarchy 528 to determine if hierarchy 528 is valid. If centralized hierarchy 528 is valid, hierarchy management program 520 can determine other hierarchies to which the "NewCost" piece of reference data should be added. In this example, because centralized hierarchy 524 also contains the "DE3" cost group, this hierarchy can also be instantiated with the "NewCost" piece of reference data and associated parameters and relationships added. Business rules associated with hierarchy 524 can be applied to determine if the "NewCost" piece of reference data is valid for centralized hierarchy 524.

If the "NewCost" piece of reference data is a valid addition to centralized hierarchy 524, hierarchy management program 520 can export centralized hierarchy 524 to financial system 502 to update hierarchy 400. If the "NewCost" addition to centralized hierarchy 524 or centralized hierarchy 526 is not valid, on the other hand, the hierarchy management program can notify financial system 504 that the update is invalid and export an earlier version of centralized hierarchy 526 (i.e., a version that did not include the "NewCost" addition) to financial system 504 to restore hierarchy 444.

It should be noted, that validation can occur for each centralized hierarchy in which a particular change will appear. For example, if the "NewCost" addition also affects centralized hierarchy 528, then centralized hierarchy 528 can also be validated before the hierarchies of subscribing systems updated. If the change to centralized hierarchy 528 is valid according to arbitrarily defined rules associated with hierarchy 528, then the change can be propagated to hierarchy 400 according to centralized hierarchy 524 and hierarchy 508 according to centralized hierarchy 528.

In the above example, the "NewCost" piece of reference data was added at a subscribing system (i.e., financial system 504). According to another embodiment of the present invention, hierarchy management program 520 can act as the point of input for hierarchy changes. In this case, the addition of the "NewCost" piece of reference data can be added directly to centralized hierarchy 528. Centralized hierarchy 528 can be validated, the change propagated to other centralized hierarchies (e.g., centralized hierarchy 524 and centralized hierarchy 528) and the other hierarchies also validated. If the change is valid across all the centralized hierarchies, hierarchy management program 520 can export the updated hierarchies to the respective systems. Additionally, when an update is made to the centralized hierarchies, hierarchy management program 520 can generate new ETL mappings and publish the ETL mappings to ETL system 518. Thus, hierarchy management program 520 can become the point of input for hierarchy changes. This allows a hierarchy change to be entered and validated at a single system before the change is propagated across the enterprise to subscribing systems.

Hierarchy management system 514 can thus act as a hub where hierarchies can be maintained, analyzed and validated before being sent to subscribing systems (i.e., any systems or applications that push data to or pull data from hierarchy management system). Hierarchy management system 514 can manage hierarchies and alternate views and can store any additional information needed to support a subscribing system, such as, alternate names and descriptions, formulae, allocation mechanisms and percentages and aggregation methods.

Hierarchy management program 520 allows users to go to one place and manage the hierarchies for all or select applications across their organization, simplifying and consolidating the task of hierarchy management. Hierarchy management system 514 can be used to manage hierarchical reference data (chart of accounts, cost center rollups, product structure, customer relationships and other hierarchical reference data) and other reference data mappings (old G/L account to new G/L account).

In one embodiment of the present invention, hierarchy management system 514 can maintain versions of centralized hierarchies. For example, hierarchy management system 514 can maintain reference data, relationships and properties for each version of centralized hierarchy 528 as centralized hierarchy 528 changes through time. This can allow an older version of hierarchy 528 to be viewed and changes in a hierarchy over time to be identified. This can facilitate compliance with regulatory requirements that require in reporting structures to be detailed. Additionally, hierarchy management system 514 can maintain a set of permissions associated with centralized hierarchies, versions and particular pieces of reference data. In this embodiment of the present invention, only the user with an appropriate permission can update a particular centralized hierarchy, version or piece of reference data.

Figure 6:
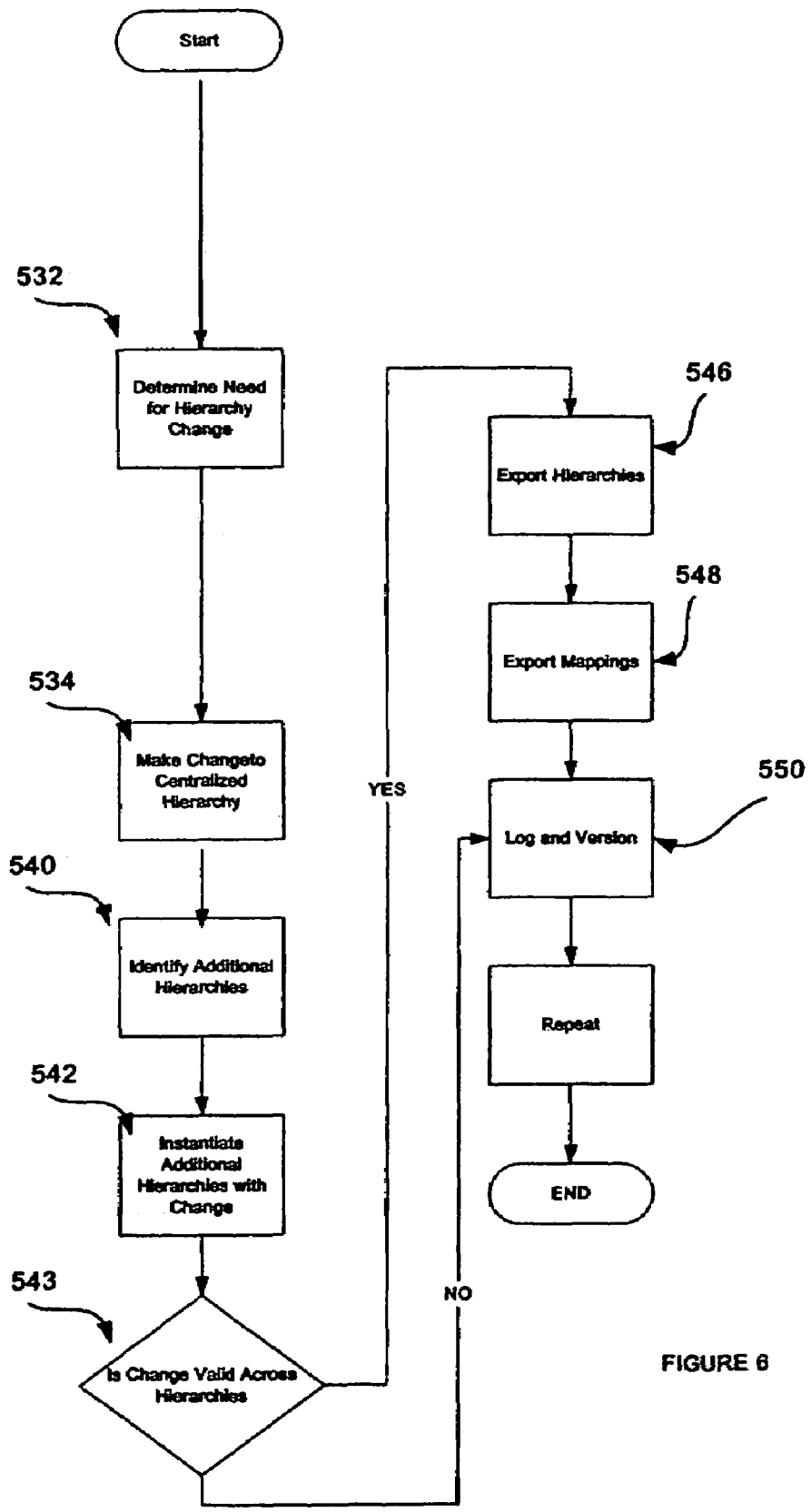
FIG. 6 is a flow chart illustrating one embodiment of a process for managing changes to hierarchies in an enterprise.

FIG. 6 illustrates one embodiment of a process for managing hierarchy change. At step 532 a user can determine that a hierarchy change is necessary. This can be done, for example, through the use of hierarchy analysis tools. At step 534, the user can make the hierarchy change in a centralized hierarchy corresponding to the subscribing system for which it was determined a hierarchy change should be made. In this embodiment of the present invention, the change can be input directly at the hierarchy management program without making the change to the hierarchy of a subscribing system until the change is validated by the hierarchy management program. In another embodiment of the present invention, the change can be made to a subscribing system (e.g., financial system 504 of FIG. 5), imported by the hierarchy management program and merged with the centralized hierarchy. A hierarchy management program can import the change (step 536) from the source system and merge the change into a corresponding centralized hierarchy (step 538). Additionally, the hierarchy management program, at step 540, can determine additional centralized hierarchies to which the change should be propagated. At step 542, the hierarchy management program can instantiate the additional centralized hierarchies with the change and, at step 543, determine if the change is valid across the centralized hierarchies to which the change applies. Validation can be performed through the application of arbitrarily defined rules to each centralized hierarchy.

If the change is valid across the centralized hierarchies maintained by the hierarchy management program, the centralized hierarchies exported (step 546) to the respective subscribing systems in which the change is not already reflected. New ETL mappings can also be generated and pushed out to an ETL system (step 548). Additionally, the changes to reference data, relationships and properties for each hierarchy can be stored in a set of master reference data (step 550). The changes can be further validated against additional rules (step 548), such as arbitrarily defined business rules. Updates can be logged and versioned (step 550). According to one embodiment of the present invention, both valid and invalid updates can be logged and versioned. The process of FIG. 6 can be arbitrarily repeated.

Hierarchy management program 520 can provide centralized, formalized management of hierarchies that ensures that all subscribing systems' hierarchies are reconciled. According to one embodiment of the present invention, hierarchy management program 520 can utilize a hierarchy object model for hierarchy management. Viewed conceptually, the master reference data for the centralized hierarchies can be graphed as set of interconnected pieces of reference data.

Figure 7:
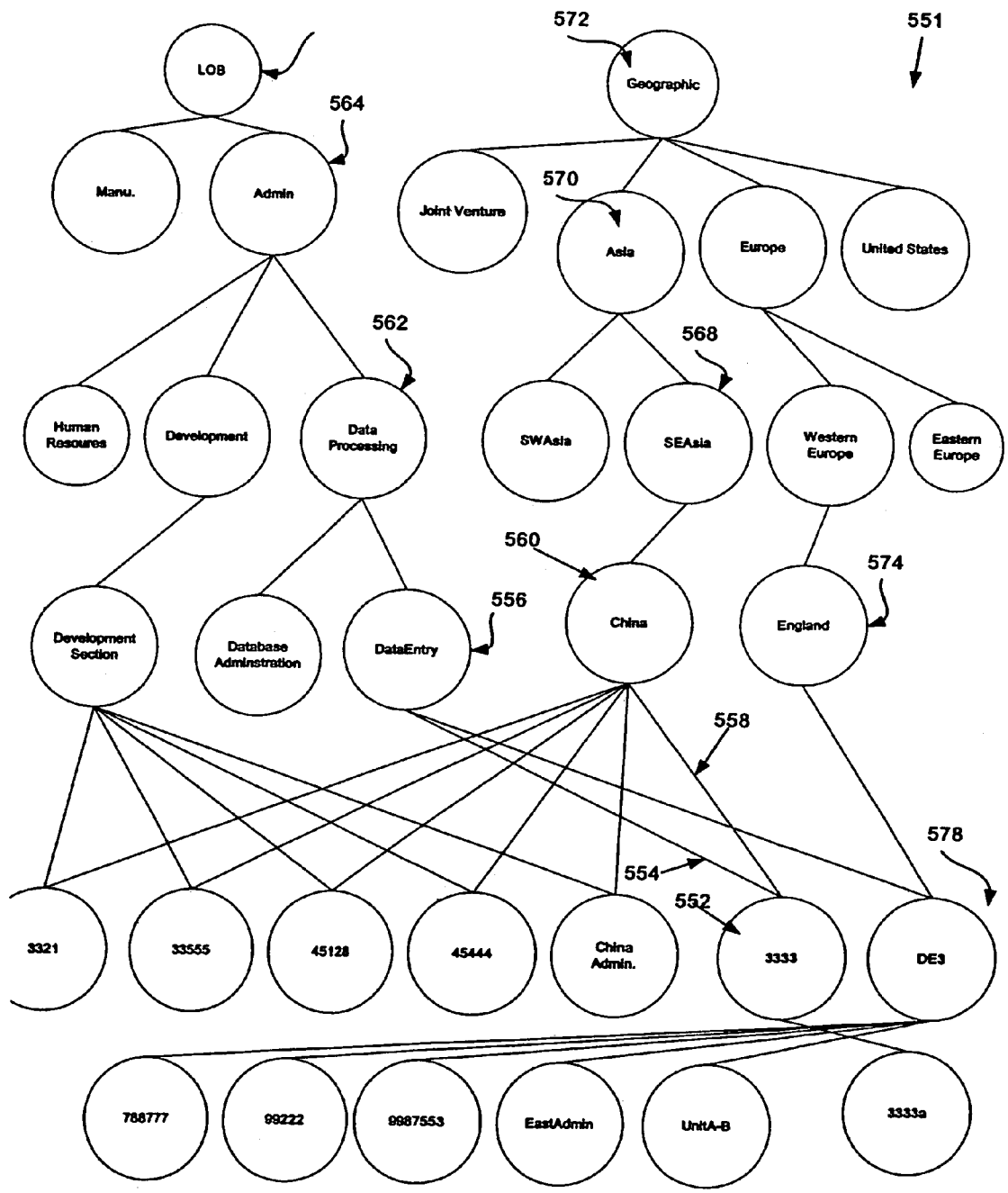
FIG. 7 is an embodiment of a graph of the example reference data.

FIG. 7 is a graphical representation of the hierarchies of master reference data for the hierarchies of FIG. 4A and FIG. 4B. Graph 551 can include nodes representing the reference data and associated attributes joined by relationships representing the relationships between the nodes. Each node in the graph can have children and/or parent nodes. Node 552, for example, represents the "3333" cost center, has relationship 554 with parent node 556 representing the "Data Entry" and relationship 558 with parent 560 representing "China". Graph 551 can be arbitrarily complex, depending on the hierarchies at issue.

A hierarchy is essentially a slice of graph 551, beginning at a selected top node and including the children and other descendent nodes of that top node. For example, if node 566 is selected as the top node, graph 551 can be traversed from parent to child to produce hierarchy 400 of FIG. 4A. Similarly, if node 572 is selected, graph 551 can be traversed from parent to child to produce hierarchy 444 of FIG. 4B. Hierarchies can also be based on lower nodes such as node 556 to create a "DataEntry" hierarchy or node 574 to create an "England" hierarchy.

The same node in graph 551 may have different properties for a given hierarchies. For example, node 578 may represent a point at which costs should be aggregated by a costing system in an "England" hierarchy, but not a "DataEntry" hierarchy. Each node in graph 551 can therefore be viewed as an abstraction of the piece of reference data across hierarchies and the instantiation of the reference data in a particular hierarchy. In other words, each piece of reference data can be represented independent of the hierarchies in which it is instantiated and according to those hierarchies.

According to one embodiment of the present invention, a hierarchy management program can maintain a hierarchy object model to represent pieces of reference data and relationships between pieces of reference data independent of hierarchies and in particular hierarchies. The hierarchy object model can account for inherencies in a particular hierarchy, inherencies across multiple hierarchies, global and local properties and arbitrarily defined properties. The hierarchy object model can be applied to a master set of reference data that represents the reference data being managed to instantiate particular centralized hierarchies.

Figure 8:
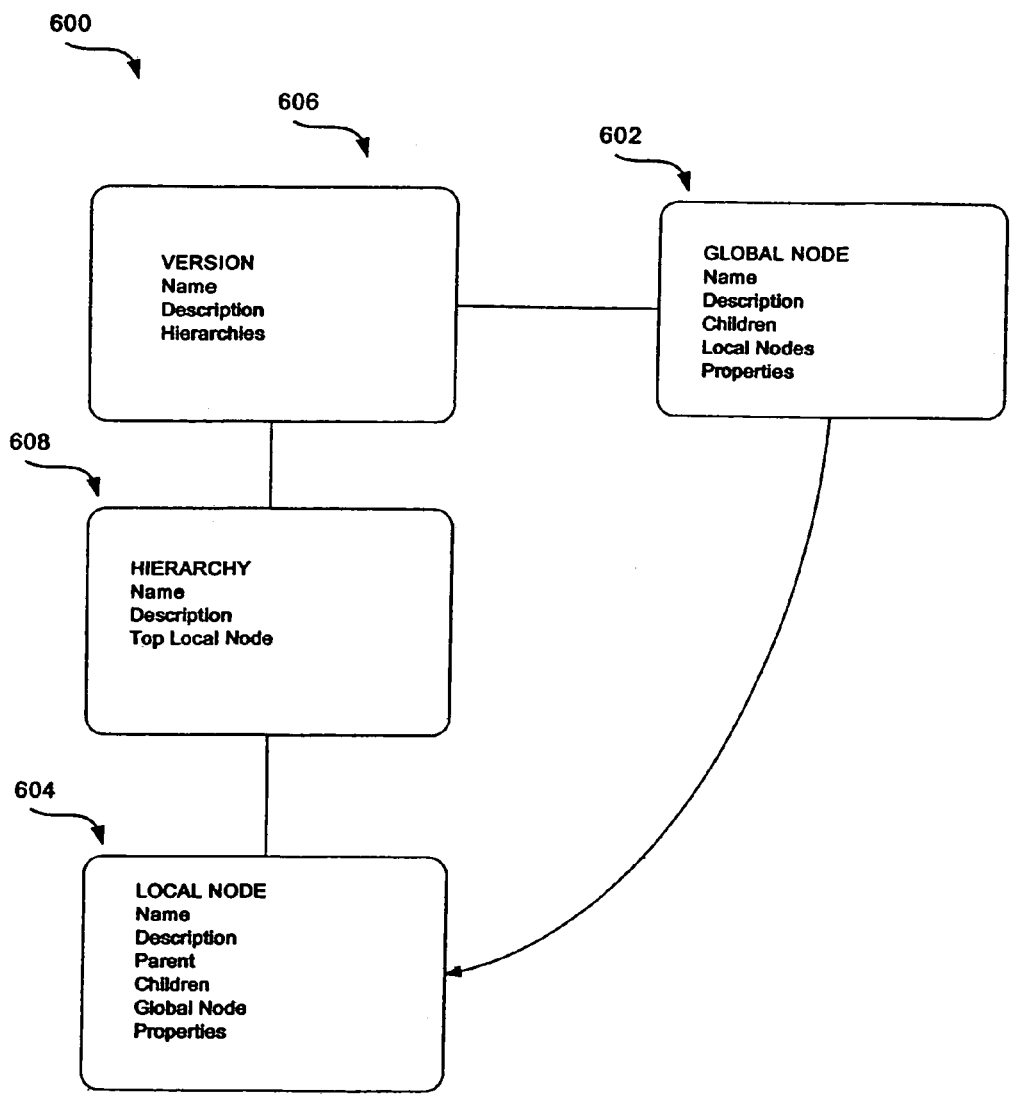
FIG. 8 is a diagrammatic representation of a hierarchy object model according to one embodiment of the present invention.

FIG. 8 is a diagrammatic representation of one embodiment of a hierarchy object model 600 that can be used to formalize hierarchy management. Hierarchy object model 600 can include global nodes 602 and local nodes 604. A global node represents a piece of reference data, associated properties and relationships with other pieces of reference data independent of the hierarchies. In other words, a global node can be an abstraction of a piece of reference data occurring in one or more hierarchies. A local node represents a particular piece of reference data, its properties and relationships in a particular hierarchy. In one embodiment of the present invention global node and local node objects can be implemented as objects of a "node" object class.

Global node 602 can include a name, a set of properties, and a list of children. Additionally, global node 602 can include a list of all local nodes that represent instantiations of global node 602 in particular hierarchies. Properties in a global node can be assigned a global value. The value of global properties are the same across all local nodes corresponding to the global node 602. The value of a property can also be assigned locally or according to a property class (locally or globally), as discussed below. The value of global inheriting properties can be assigned at the local node level in the controlling hierarchy, the value of a property assigned to a property class can be derived based on the rules set forth in that property class. Example property classes are discussed in conjunction with FIGS. 9-11, below. For inheriting properties, a controlling hierarchy can be assigned. A controlling hierarchy, as will be discussed in conjunction with FIGS. 9 and 10, indicates the particular local node 604 or hierarchy that controls the value of the property across other local nodes based on the same global node.

Hierarchy object model 600 can also include a version object 606 that indicates the version of a particular hierarchy or set of hierarchies and one or more hierarchy objects 608 that indicate the hierarchies in the version. Version object 606 can include attributes for version description, version identification, version name and other arbitrarily defined attributes. Hierarchy object 608 can provide a pointer to a top local node for the hierarchy, a hierarchy identification, a hierarchy description and other arbitrarily defined attributes.

Figure 9:
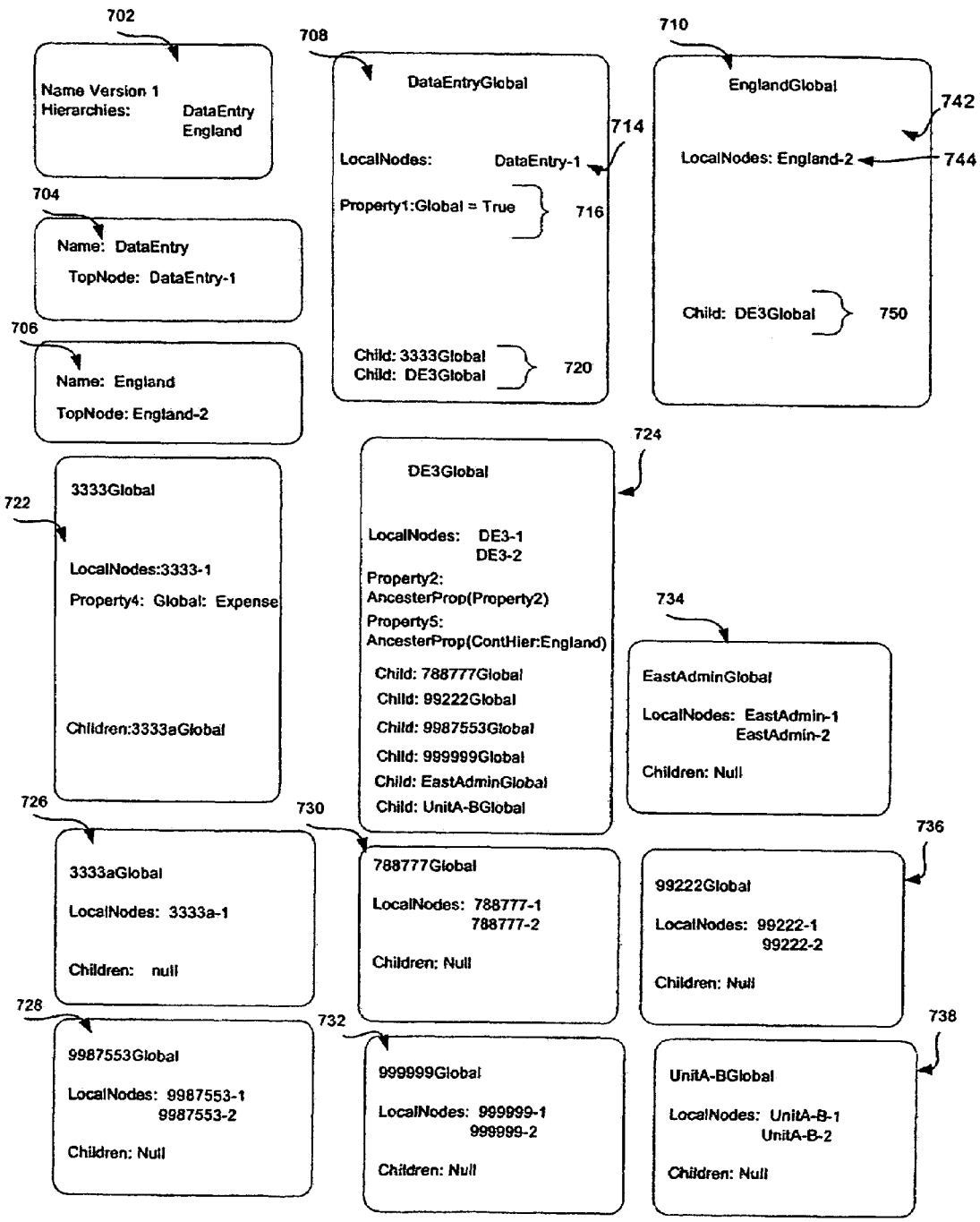
FIG. 9 is a diagrammatic representation of example versions, hierarchy objects and global nodes according to one embodiment of a hierarchy object model.
Figure 10:
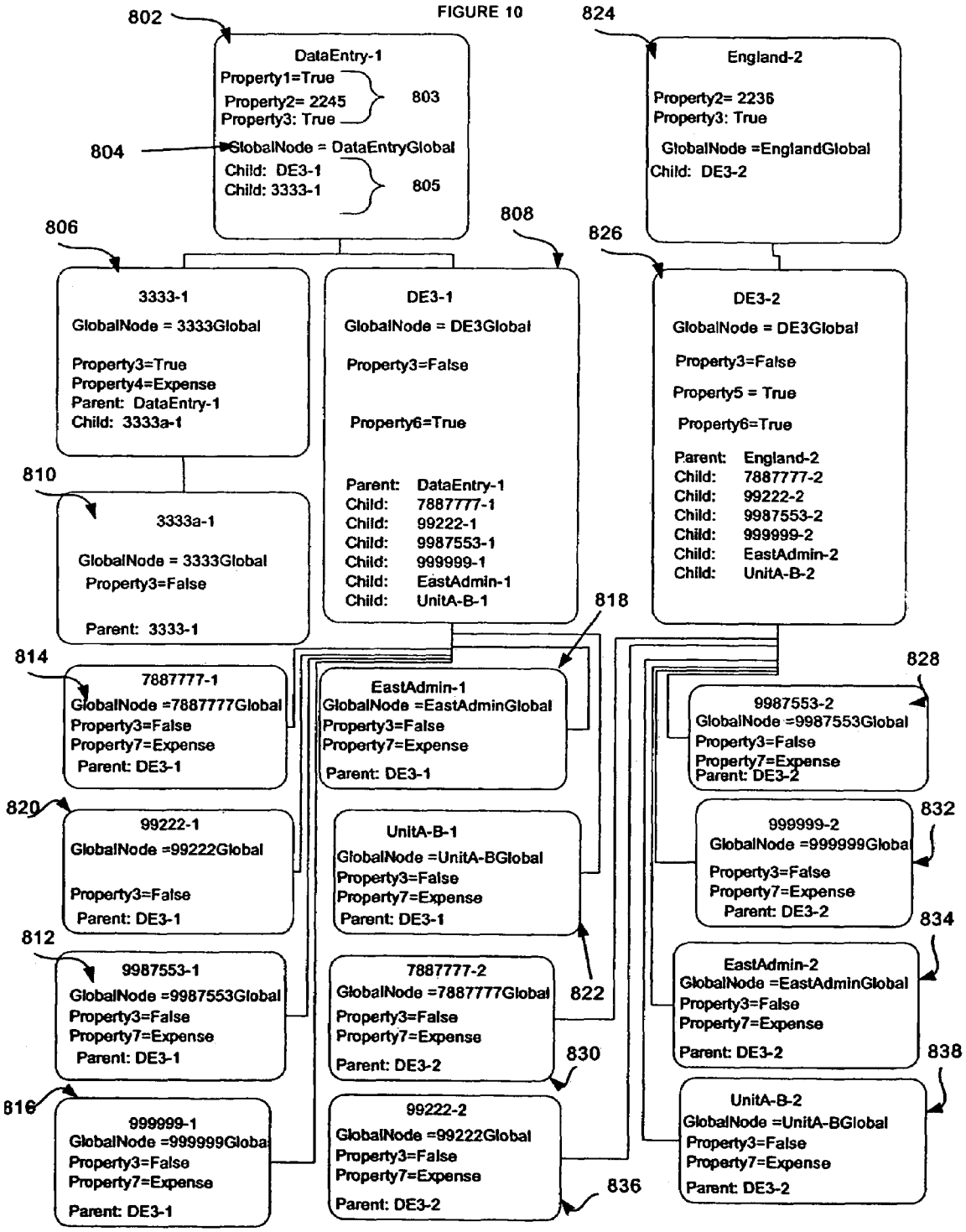
FIG. 10 is a diagrammatic representation of example local nodes according to one embodiment of a hierarchy object model.
Figure 11:
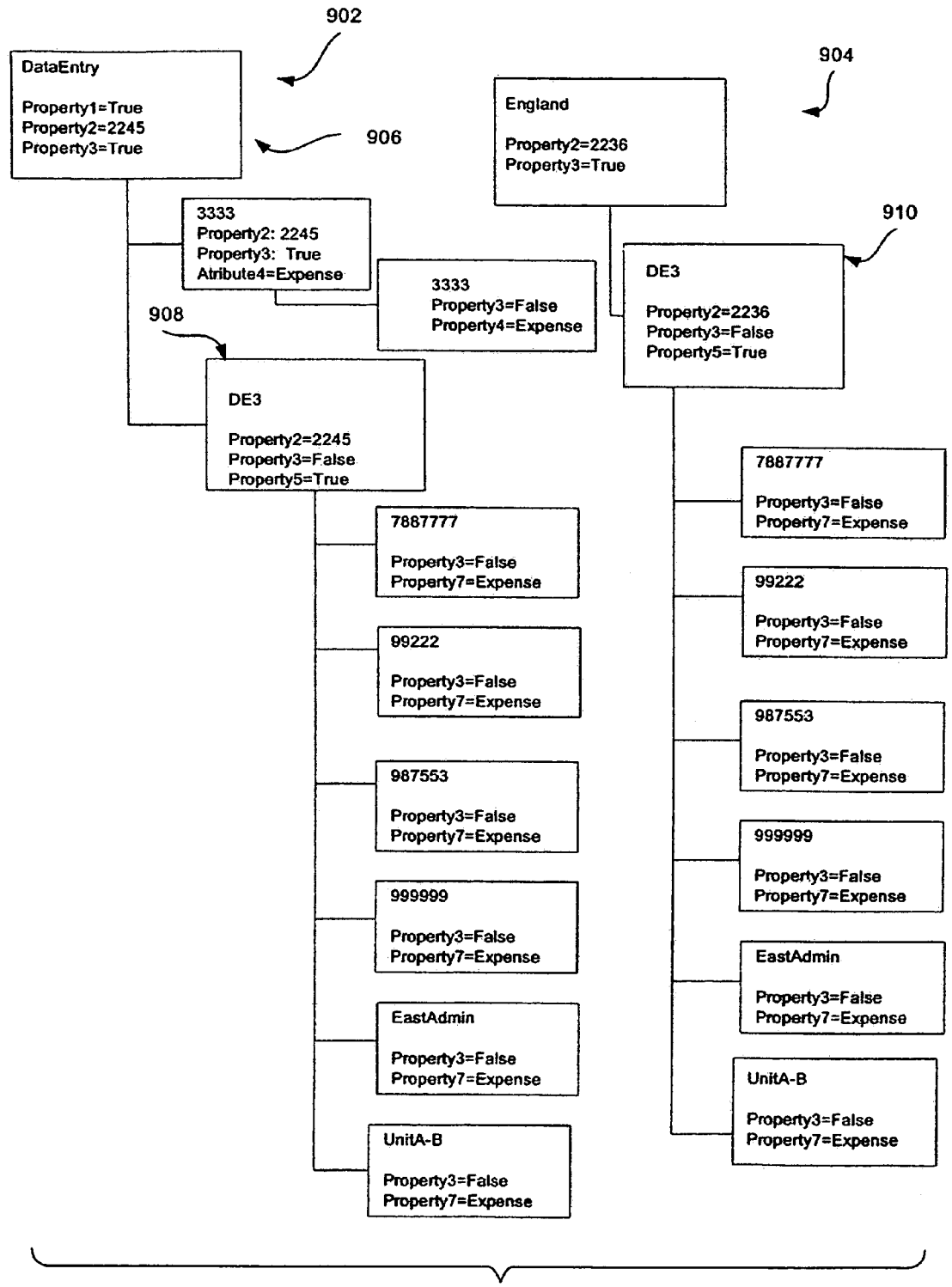
FIG. 11 is a diagrammatic representation of example hierarchies according to one embodiment of the hierarchy object model.

FIGS. 9-11 provide an example of applying a hierarchy object model for instantiating centralized hierarchies from a master set of reference data stored in a database (e.g., Microsoft SQLServer, Oracle, Sybase, ODBC or other database management system known in the art), and can be loaded into memory when hierarchies are instantiated, validated or manipulated. According to one embodiment of the present invention, the master set of reference data can be stored according to a normalized data model that can be used for storing data according to various database management systems. The database storing the master set of reference data can be separate from the databases used by the underlying subscribing systems.

FIG. 9 is a diagrammatic representation of example version objects, hierarchy objects and global nodes according to one embodiment of the present invention. FIG. 10 is a diagrammatic representation of example local nodes. For each piece of reference data in a hierarchy there can be a local node for each hierarchy and a global node representing the piece of reference data across hierarchies. Global nodes can act as bridges between hierarchies and containers for global properties and relationships.

Referring to FIG. 9, version object 702 can specify that a particular version (e.g., "version1") contains a "Data Entry" hierarchy and an "England" hierarchy. Version object 702 allows the hierarchy management program to determine which hierarchies to instantiate for a version. By maintaining versions, changes between hierarchies or sets of hierarchies over time can be tracked. Based on the entries in version object 702, hierarchy object 704 and hierarchy object 706 can be accessed. Hierarchy object 704 indicates that instantiation of the "DataEntry" hierarchy can begin with "DataEntry-1" local node and hierarchy object 706 indicates that instantiation of the "England" hierarchy begins with an "England-1" node.

Referring briefly to FIG. 10, "DataEntry-1" local node 802 represents the "DataEntry" piece of reference data for the "DataEntry" hierarchy and is the top node for the "DataEntry" hierarchy as defined by the "DataEntry" hierarchy object. Local node 802 can include a name, a description, one or more properties, a parent, and list of children local nodes. Because "DataEntry-1" local node 802 is the top node in the hierarchy, its parent list will be empty. Property list 803 can include a list of local properties. The values for the local properties can be based on a default, a user selected value, can be inherited from another local node or can be derived based on an arbitrarily defined process. "DataEntry-1" local node 802 can also include a global node indicator 804 that indicates a corresponding global node. In other words, the global node indicator points to a global node that represents the Data Entry piece of reference data without respect to the particular hierarchy. In this case, global node indicator points to a "DataEntryGlobal" global node. Additionally, "DataEntry-1" local node 802 can include a list of children 805. From the list of children, the hierarchy management program can instantiate children global nodes.

Returning to FIG. 9, with respect to the "Data Entry" hierarchy, global properties for a "Data Entry" piece of reference data can be defined in "DataEntryGlobal" global node 708. "DataEntryGlobal" global node 708 can include the name "DataEntryGlobal" by which the global node can be referenced, a list of local nodes 714 corresponding to "DataEntryGlobal" global node 708, a set of properties 716 and a set of children global nodes 718. The list of local nodes 714 can indicate the hierarchy with which each local node is associated. In the Example of FIG. 9 the naming convention "-1" indicates the "Data Entry" hierarchy and "-2" indicates the "England" hierarchy, though any scheme of indicating hierarchies of corresponding local nodes can be used. Properties 716 can include arbitrarily defined properties of global node 708. Although only one property is shown for global node 708, it should be understood that an arbitrary number of properties can be associated with a global node. Because "Property1" is set to True in "DataEntryGlobal" global node 708, the "Data Entry" piece of reference data will have an associated "Property1" equal to True regardless of the hierarchy in which it appears.

In instantiating the "DataEntry" hierarchy, the hierarchy management program can instantiate children global node objects from children list 720 of "DataEntryGlobal" global node 708. In this example, the hierarchy management program can access "3333Global" global node 722 and "DE3Global" global node 724. Each of these global nodes can include a name, a list of properties, a list of corresponding local nodes, a list of global node children and other arbitrarily defined data.

Continuing with global nodes corresponding to the "DataEntry" hierarchy, "DE3Global" global node 724 can include a property "Property2" set to a property class "AnscestorProp(Property2)". This indicates that the value of "Property2" for "DE3" piece of reference data in a hierarchy should be inherited from the value of "Property2" from a parent local node or other ancestor local node in the same hierarchy. "DE3Global" global node 724 can also include a property "Property5" set to a property class "AnscestorProp (ContHier:England)". This indicates that for the "DE3" piece of reference data in a particular hierarchy the value of "Property5" should be inherited from the value set in the England hierarchy. Therefore, the value of "Property5" set in the England hierarchy will control. Continuing with the example of FIG. 9, global nodes can further include "3333aGlobal" global node 726, "9987553Global" global node 728, "788777Global" global node 730, "999999Global" global node 732, "EastAdminGlobal" global node 734, "99222Global" global node 736 and "UnitA-BGlobal" global node 738. Each of these global nodes can include a list of local nodes corresponding to the same piece of reference data as the global node, a list of global properties and other arbitrarily defined attributes. Because these nodes represent the last nodes in each branch of a hierarchy, they include an empty list of children.

Referring to FIG. 10, local node 806 and local node 808 represent example local nodes corresponding to global node 722 and global node 724, respectively. Local node 806 and local node 808 can be instantiated based on the list of children 807 associated with local node 802. Using the example of "DE3-1" local node 808, DE3-1 local node 808 indicates that the parent local node is "DataEntry-1", linking local node 808 to local node 802, the global node corresponding to local node 802 is "DE3Global", linking local node 808 to global node 724 of FIG. 9 and that local node 808 has children "788777-1", "99222-1", "9987553-1", "999999-1", "EastAdmin-1" and "UnitA-B-1", linking local node 808 to local nodes 814, 820, 812, 816, 818 and 822. "DE3-1" local node 808 can include "Property2" having a value of "2245". This value is inherited from local node 802 according to the property class indicated in global node 724. Local node 808 can further include "Property5" having a value of True. The value of "Property5" is established in corresponding local node 810 in the controlling "England" hierarchy as indicated in global node 724.

When local node 808 is initially instantiated, several of the values shown in FIG. 10 may not be known. For example, the value of "Property5" may not be known until a value for "Property5" is loaded for local node 810 of the controlling England hierarchy. To account for this, the hierarchy management program can continually update property values as the values become available. Additionally, the hierarchy management program can update the list of local nodes for a particular global node as the local nodes are instantiated.

Continuing with the local nodes for the "DataEntry" hierarchy in FIG. 10, and with reference to FIG. 9, "3333a-1" local node 810, "9987553-1" local node 812, "788777-1" local node 814, "999999-1" local node 816, "EastAdmin-1" local node 818, "99222-1" local node 820, and "UnitA-B-1" local node 822 correspond to "3333aGlobal" global node 726, "9987553Global" global node 728, "788777Global" global node 730, "999999Global" global node 732, "EastAdminGlobal" global node 734, "99222Global" global node 736 and "UnitA-BGlobal" global node 738, respectively, for the "DataEntry" hierarchy.

With respect to the "England" hierarchy, the hierarchy management program can instantiate the "England-2" local node 824 based on the "England" hierarchy object. The hierarchy management program can then instantiate the children local nodes, including "DE3-2" local node 826. In FIG. 10, "DE3-2" local node 826 represents a local node corresponding to "DE3Global" global node 724 of FIG. 9 for the England hierarchy. In "DE3-2" local node 826, the value of "Property2" is equal to 2236, different from the value of "Property2" in "DE3-1" local node 808. This occurs because "DE3-2" local node 826 inherits its value of "Property2" from parent local node 824, whereas "DE3-1" local node 808 inherits its value from local node 802. This inheritance is dictated by the "DE3Global" global node 724 of FIG. 9. "Property5" can be set in "DE3-2" local node 824 as "DE3-2" local node 824 is a member of the controlling hierarchy. The value of "Property5" in all other local nodes instantiated based on "DE3Global" node 724 of FIG. 9 can be inherited across hierarchies from "DE3-2" local node 824 according to the property's property class. The value of "Property5" set in DE3-2 local node will control the value of "Property5" across hierarchies based on the controlling hierarchy designation for "Property5" in "DE3Global" global node 724.

Continuing with FIG. 10, and with reference to FIG. 9, "9987553-2" local node 828, "788777-2" local node 830, "999999-2" local node 832, "EastAdmin-2" local node 834, "99222-2" local node 836, and "UnitA-B-2" local node 838 can correspond to "9987553Global" global node 728, "788777Global" global node 730, "999999Global" global node 732, "EastAdminGlobal" global node 734, "99222Global" global node 736 and "UnitA-BGlobal" global node 738, respectively, for the England hierarchy.

Returning briefly to FIG. 9, the only global node corresponding to a piece of reference data in the "England" hierarchy, but not the "DataEntry" hierarchy is the "EnglandGlobal" global node 710. This global node can include the name "EnglandGlobal" by which the global node can be referenced a list of local nodes 744 based on "EnglandGlobal" global node 710 for a particular version, a set of properties and a set of children global nodes 750. In this case, there are no global properties. As each of the local nodes for the "England" hierarchy are instantiated the list of corresponding local nodes for "England" global node 744, "DE3Global" global node 724, "9987553Global" global node 728, "788777Global" global node 730, "999999Global" global node 732, "EastAdminGlobal" global node 734, "99222Global" global node 736 and "UnitA-BGlobal" global node 738 can be updated accordingly.

In instantiating a centralized hierarchy, according to one embodiment of the present invention, all the global nodes can be instantiated by the hierarchy management program. A top local node can be identified from the hierarchy object for the centralized hierarchy. Children for the top local node can be identified from the global children list in the global node because each local node will have the same children regardless of hierarchy, though the properties in the children may vary according to hierarchy. The appropriate local node children for the centralized hierarchy's top node can be identified through, for example, a hierarchy indicator in the database maintained by the hierarchy management program. The local node children can then be instantiated. This process can be repeated for each local node in the centralized hierarchy until all the local nodes for the hierarchy are instantiated. In other embodiments of the present invention, local and global nodes can be instantiated in parallel, local nodes instantiated first or according to any other suitable scheme.

FIGS. 9 and 10 are provided by way of example. The global and local names can include arbitrarily defined names and properties with a global node representing a particular piece of reference data for one or more hierarchies and corresponding local nodes representing the piece of reference data in a particular hierarchy. While only parent/child relationships are shown in FIG. 9 and FIG. 10, each node can include additional information about ancestors. For example, a local node can include a listing of its parent local node, grandparent local node and additional ancestors. Similarly, global and local node can include a listing of children global and local nodes, grandchildren local global nodes and other descendants. Table 1 provides an example of various attributes for version objects, hierarchy objects, global nodes and local nodes. Table 1 includes a list of common properties, how the property is defined, the data type of the property, where the property is established, a brief description of the property and whether the property is set locally or globally.

TABLE 1

| Property | Type | Data Type | Set In Node/Version/Hierarchy | Description | Set Locally/Globally |
|---|---|---|---|---|---|
| AncestorList | Derived | String | Node | Comma delimited list of ancestor nodes | Local |
| ChildList | Derived | String | Node | Comma delimited list of Child nodes | Global |
| Children | Derived | Integer | Node | Number of Children | Global |
| Descendants | Derived | Integer | Node | Number of Descendants | Global |
| Leaf Children | Derived | Integer | Node | Number of Leaf Children | Global |
| Leaf Descendants | Derived | Integer | Node | Number of Leaf Descendants | Global |
| LeafSiblings | Derived | Integer | Node | Number of Leaf Siblings | Local |
| Level | Derived | Integer | Node | Node Level in Hierarchy (Root = 1) | Local |
| Limb Children | Derived | Integer | Node | Number of Limb Children | Global |
| Limb Descendants | Derived | Integer | Node | Number of Limb Descendants | Global |
| LimbSiblings | Derived | Integer | Node | Number of Limb Siblings | Local |
| LinkedFlag | Derived | Boolean | Node | Node is in Other hierarchies | Global |
| Links | Derived | String | Node | Comma delimited list of all other linked hierarchies, excluding the one being viewed | Local |
| NumLinks | Derived | Integer | Node | Number of other hierarchies node is in | Global |
| References | Derived | String | Node | Comma delimited list of all linked hierarchies, including the one being viewed | Global |
| SiblingList | Derived | String | Node | Comma delimited list of Sibling nodes | Local |
| Siblings | Derived | Integer | Node | Number of Siblings | Local |
| Abbrev | Defined | String | Node | Node Name | Global |
| Descr | Defined | String | Node | Node Description | Global |
| DisplayBy | Derived | String | Hierarchy | Method to display this hierarchy | Local |
| HierDescr | Defined | String | Hierarchy | Hier Description | Local |
| HierFilter | Defined | String | Hierarchy | Hier Filter. A Hierarchy filter can be a saved query that is used to hide particular nodes in a hierarchy. | Local |
| HierFilter | Derived | String | Hierarchy | Filter for this hierarchy | Local |
| HierID | Derived | Integer | Hierarchy | Hier ID | Local |
| HierName | Defined | String | Hierarchy | Hier Name | Local |
| HierSort | Defined | String | Hierarchy | Hier Sort | Local |
| HierSort | Derived | String | Hierarchy | Property to define Hierarchy Sorting | Local |
| ID | Derived | Integer | Node | Internal Node ID | Global |
| Inactive | Defined | Boolean | Node | Node has been inactivated | Global |
| Leaf | Defined | Boolean | Node | Leaf Flag | Global |
| LeafAccess | Derived | String | Node | Leaf Access Level | Local |
| LimbAccess | Derived | Boolean | Node | Limb Access Level | Local |
| LongName | Derived | String | Node | Long Node Name | Global |
| MergeID | Defined | Integer | Node | ID of the Merge Node | Global |
| NodeApproved | Derived | Boolean | Node | Node has been in a finalized version | Global |
| Parent Node | Derived | String | Node | Parent Node Name | Local |

TABLE 1-continued

| Property | Type | Data Type | Set In Node/ Version/ Hierarchy | Description | Set Locally/ Globally |
|---|---|---|---|---|---|
| ParentDescr | Derived | String | Node | Parent Description | Local |
| ParentID | Derived | Integer | Node | Parent ID | Local |
| ParentLongName | Derived | String | Node | Parent Long Name | Local |
| UserDisplayBy | Defined | NodePrps | User-Hierarchy | User specification for display by | Local |
| UserHierFilter | Defined | Query | User-Hierarchy | User specified filter for this hierarchy | Local |
| UserHierSort | Defined | SortProp | User-Hierarchy | User specified sort for this hierarchy | Local |
| VersionDescr | Defined | String | Version | Version Description | Global |
| VersionID | Derived | Integer | Version | Version ID | Global |
| VersionName | Defined | String | Version | Version Name | Global |

In the example of Table 1, the values of "derived" properties can determined by the hierarchy management program for a particular hierarchy. As the hierarchy is modified by, for example, adding or removing nodes, the hierarchy management program can establish new values for the derived properties. The properties of Table 1 are provided by way of example and not limitation.

As discussed previously, local or global properties can also derived based on property classes. The property classes define rules for determining a particular property value. Table 2 provides several example property classes and their descriptions.

TABLE 2

| Class | Description |
|---|---|
| AncestorProp | Traverses up the local or controlling hierarchy until it hits a node that has a specified property equal the given value and then returns the specified return property. For example, can traverse hierarchy to find out which property has the value "True". |
| AscNodeProp | Goes to the node pointed to by the specified node property and returns the specified property |
| Children | Returns the list of children nodes in, for example, a comma delimited form |
| Concat | Concatentes the specified properties |
| DefaultProp | Returns the default value for the specified property |
| DualAncestorProp | Traverses up the local or controlling hierarchy until it hits a node the specified properties equal the given values and then returns the specified return property |
| Format | Formats a string based on the given properties and format control |
| FormattedDate | Formats a date based on the given property and date format control |
| Formula | returns a value based on a specified formula |
| Hiers | Returns a list of hierarchies |
| ParentProp | Returns a property from the parent node |
| SubString | Used to return a substring |
| TotalLeafs | Returns the total number of leafs from here |
| TotalLimbs | Returns the total number of limbs from here |
| TotalNodes | Returns the total number of nodes from here |

It should be noted that the property classes given in Table 2 are provided by way of example only, and property values can be determined based on any arbitrarily complex class. The property classes can be implemented as scripts, object classes or in any other suitable programming manner as would be understood by those of ordinary skill in the art.

In FIG. 10, various properties are shown with values for various local nodes. For example "Property3" is defined in each local node as either True or False. It should be noted that each property value does not have to be stored independently for each local node (or global node) instead, property values can be stored as default values with each override of the property value stored independently. For example, if the default value of "Property3" is False, a default value of Property3 can be stored, and a True value can be stored for "DataEntry-1" local node 802, "3333-1" local node 806, and "England-2" local node 824, reducing the number of values that have to be stored. Similarly, values that are inherited do not have to be stored multiple times. For example, "Property5" need only be stored for "DE3-2" local node 826 as "DE3-1" local node 808 inherits this value from the controlling hierarchy. This can apply to inheritance within a hierarchy as well. As another example, the value of "2245" for "Property2" need only be stored for "DataEntry-1" local node 802 as "DE-1" local node 808 inherits the value and the value of "2236" for "Property2" need only be stored for "England-2" local node 824 as "DE3-2" local node 826 also inherits the value.

FIG. 11 is a diagrammatic representation of the "DataEntry" hierarchy 902 and the "England" hierarchy 904 instantiated from the global nodes of FIG. 9 and local nodes of FIG. 10. Each hierarchy can be instantiated based on a hierarchy object model. Each piece of reference data in a hierarchy can be associated with one or more properties that are set globally or locally based on the global and local node corresponding to that piece of reference data for the hierarchy. For example, in "DataEntry" hierarchy 902, the "Data Entry" piece of reference data (represented at 906) can be associated with a "Property1" with a value of true from "DataEntryGlobal" global node 708, a "Property2" with a value of 2245 from "DataEntry-1" local node 802 and a "Property3" with a value of True from "DataEntry-1" local node 802.

As another example, the "DE3" piece of reference data (represented at 908) in "DataEntry" hierarchy 902 can have a "Property2" equal to 2245. The value of "Property2" is set in "DE3Global" global node 724 to be inherited from the parent local node in a particular hierarchy. Therefore, the value for the "DataEntry" hierarchy is 2245 from local node 802. Whereas, in "England" hierarchy 904 the value of "Property2" for the "DE3" piece of reference data (represented at 910) is 2236 as inherited by local node 826 from local node 824. The value of "Property5" for the "DE3" piece of reference data in the "DataEntry" hierarchy 902 is set to True. This value is derived from the fact that "DE3Global" global node 724 specifies that the value of "Property5" is controlled by the England hierarchy and the "DE3-2" local node 826, corresponding to the controlling hierarchy, sets the value of "Property5" to True. The hierarchy management program can traverse a hierarchy based on the local parent, child indicators in local nodes, derive global values for a piece of reference data based on the global node indicator in a local node, and link to other local nodes based on the local node list in the global node.

Thus, the object model of the present invention allows property values to be established locally for a piece of reference data in a hierarchy, globally for a piece of reference data across multiple hierarchies, be inherited from other pieces of reference data from the same hierarchy or be inherited from other hierarchies. The use of a hierarchy object model, in one embodiment of the present invention, can also facilitate validation of hierarchies, application of business rules across hierarchies and hierarchy management.

Figure 12A:
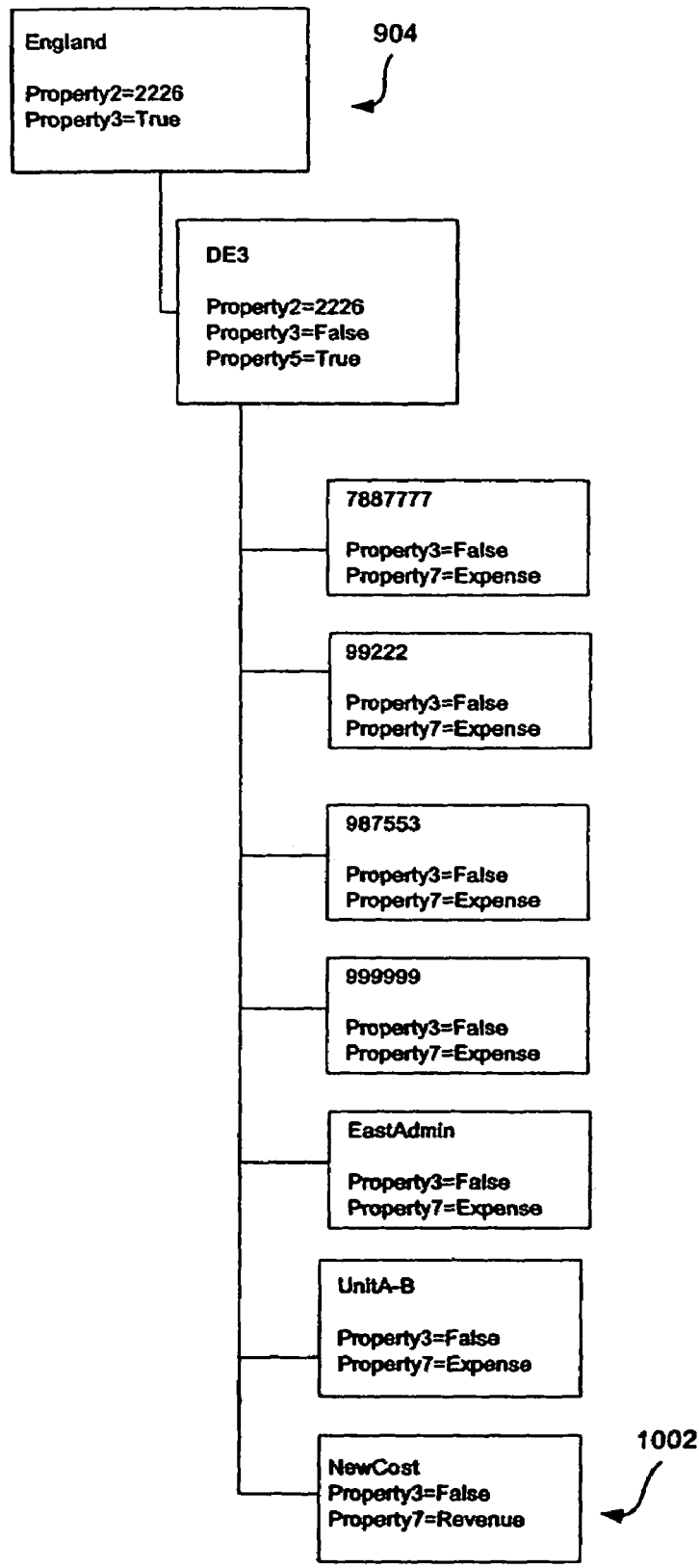
FIGS. 12A-12C are diagrammatic representations of managing change in the hierarchies of FIG. 9.
Figure 12B:
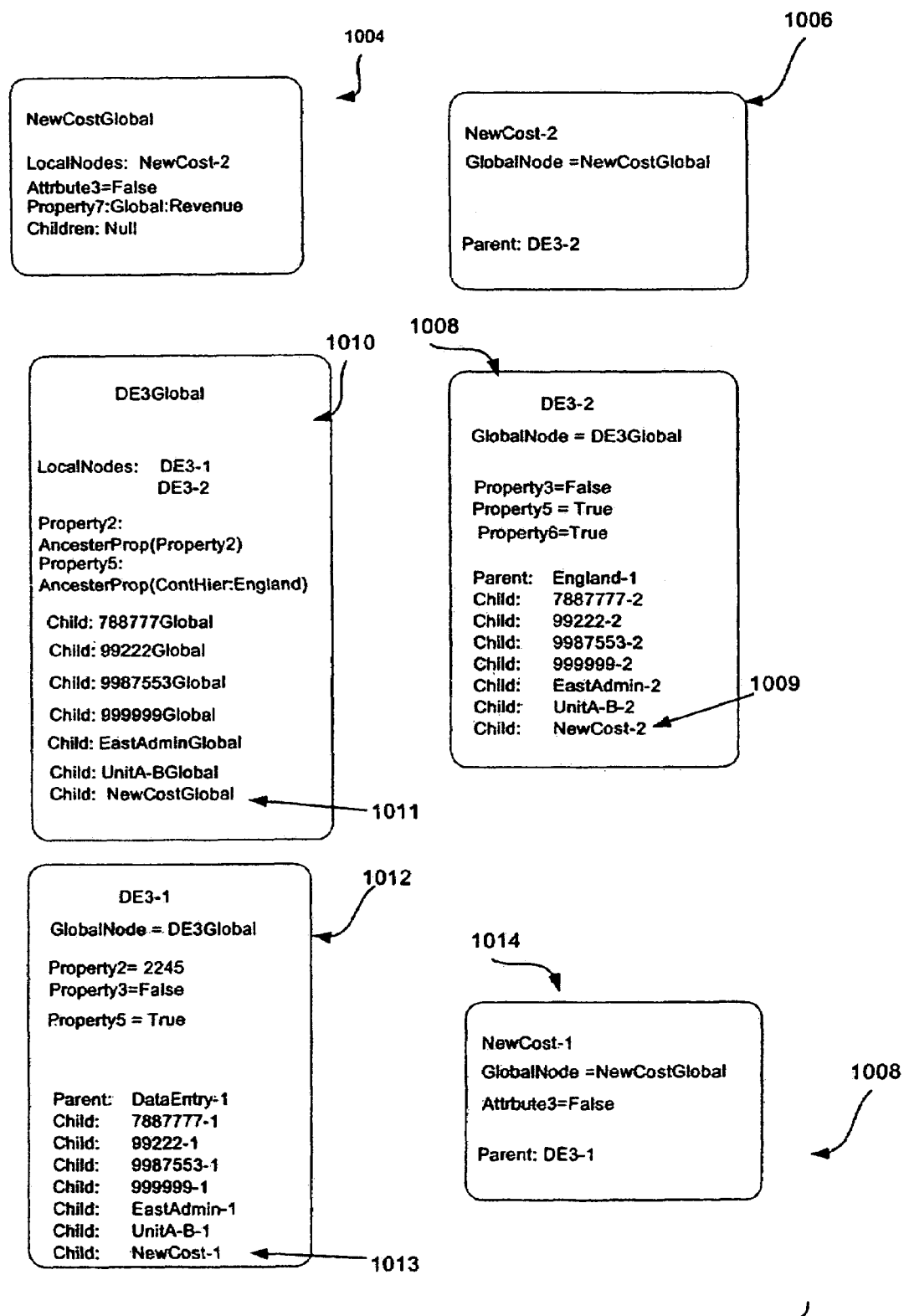

Suppose, for example, "DataEntry" hierarchy 902 is associated with a rule that each cost center must be an expense, but "England" hierarchy 904 is not associated with the same rule. Further suppose that a user wishes to modify "England" hierarchy of FIG. 11 as shown in FIG. 12A to add a cost center "NewCost". As shown in FIG. 12B, to make this change, the user can create the "NewCostGlobal" global object 1004 and "NewCost-2" local object 1004 through, for example, a graphic user interface.

Figure 12C:
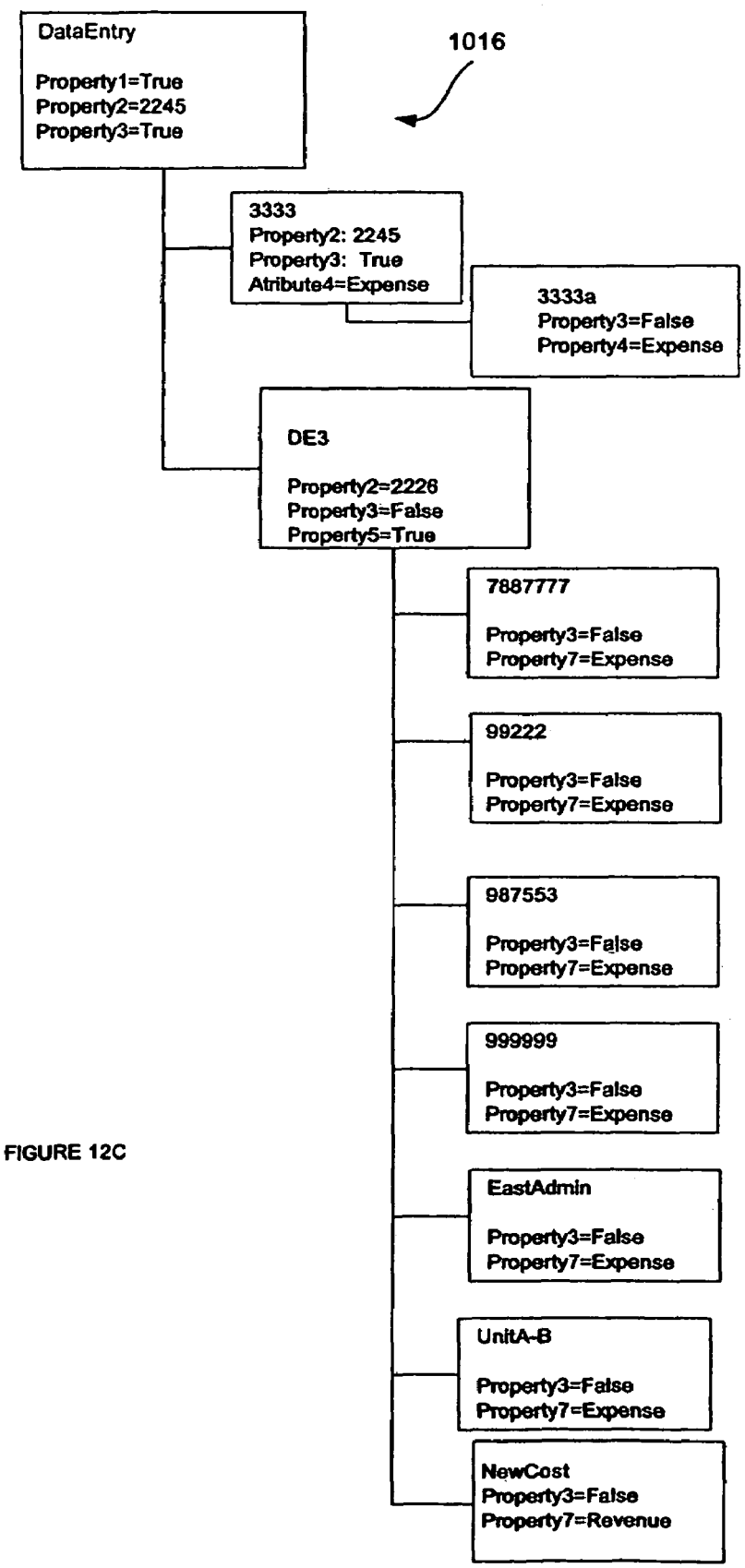

The hierarchy management program can receive local object 1002, access the parent of local node 1002 and update the parent node as shown by "DE3-2" global node 1008 to include the new global node child (represented at 1009). Additionally, the hierarchy management program can update the corresponding global node 1010 to reflect the new global node child (represented at 1011). The hierarchy management program can then determine that global node 1010 corresponds to a piece of reference data in multiple hierarchies (i.e., by the "DE3-1" entry in "DE3Global" global object 724 of FIG. 9). The hierarchy management program can revise the "DataEntry" hierarchy accordingly by, for example, creating "NewCost-1" local node 1014 and updating "DE3-1" local node 1012 to reference the new child local node (represented at 1013). The user can then be prompted to enter any local attributes of the automatically generated local node. FIG. 12C is graphical representation of the revised "DataEntry" hierarchy 1016 augmented to include the "NewCost" piece of reference data.

The hierarchy management program can apply the example business rules associated with the "DataEntry" hierarchy to determine if each cost center is an "expense". In the example of FIG. 12C, "Property7" of local node 1018 indicates that cost center "NewCost" is defined as a revenue. The hierarchy management program can therefore notify the user that the "NewCost" piece of reference data does not meet a particular criteria associated with the "DataEntry" hierarchy even the though the "NewCost" piece of reference data may be legal in the "England" hierarchy.

As another example, the hierarchy management program can apply a validation rule to ensure that a particular property has a Boolean value is set to true or false. Using the example hierarchies of FIG. 11, assume "Property3" indicates, for purposes of financial reporting programs, that a particular node is a "rollup" point. In other words, a true value in ""Property3"" indicates that the particular node is the point to which underlying transaction data should be aggregated. If "DE3-1" is a rollup point, underlying expense data will be aggregated based on the "DE3-1" piece of reference data rather than based on the piece of reference data for each underlying cost center. For some financial reporting systems, only one rollup point per hierarchy limb or branch is permitted to be designated for a particular purpose, such as budgeting, forecasting or adjustments. The hierarchy management program can, according to one embodiment of the present invention, apply a SinglePropBranch validation rule to verify that a particular property is set to True or False only once for a hierarchy branch. If, for example, the hierarchy management program runs SinglePropBranch("Property3":True) on the "DataEntry" hierarchy 902, "DataEntry" hierarchy 902 would fail because both nodes 3333-1 and 3333*a*-1 have an "Property3" set to True.

Figure 13:
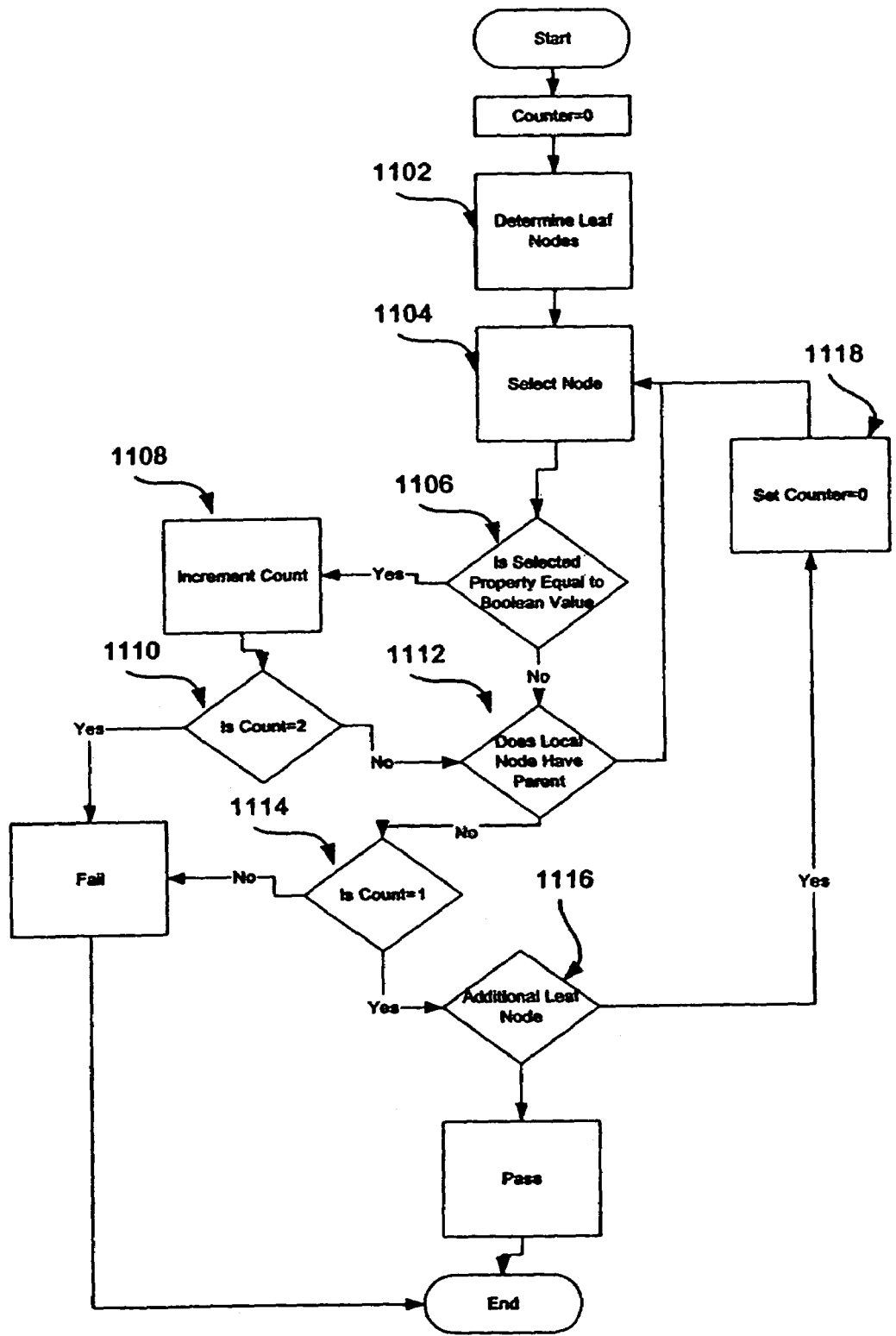
FIG. 13 is a flow chart illustrating one embodiment of a validation process.

FIG. 13 is a flow chart illustrating one embodiment of a method for a SinglePropBranch. At step 1102 the leaf nodes (i.e., nodes without any children) in a hierarchy can be determined and at step 1104 a particular leaf node can be selected. At step 1106 the hierarchy management program can determine if a selected property (e.g., "Property3") has a selected Boolean value (e.g., "True"). If the property has the selected Boolean value, the hierarchy management program can determine if the value has now been found more than once by, for example, determining if the counter is now equal to two (step 1110). If the counter is equal to two, the hierarchy fails as the value of "True" has been found twice in the same branch.

If the value of the counter is not equal to two, on the other hand, the hierarchy management program can determine if the selected local node has a parent node (step 1112). If the selected node does have parent node, the hierarchy management program can select the parent node and return to step 1104. If the selected local node does not have a parent node, the hierarchy management program can determine if the property with the specified Boolean value has been found at least once (step 1114). If the counter is not equal to one, this indicates that the selected property with selected Boolean value has not been found at least once in a branch, indicating an error.

If the selected node has no parent node and the value of the counter is one, this indicates that the particular branch has passed. The hierarchy management program can then evaluate the next branch by determining if there are additional leaf nodes (step 1116), if so, resetting the counter to zero (step 1118) and returning to step 1104 selecting the next leaf node as the selected node. If the hierarchy has not yet failed and there are no additional leaf nodes at determined step 1116, the hierarchy passes.

Figure 14:
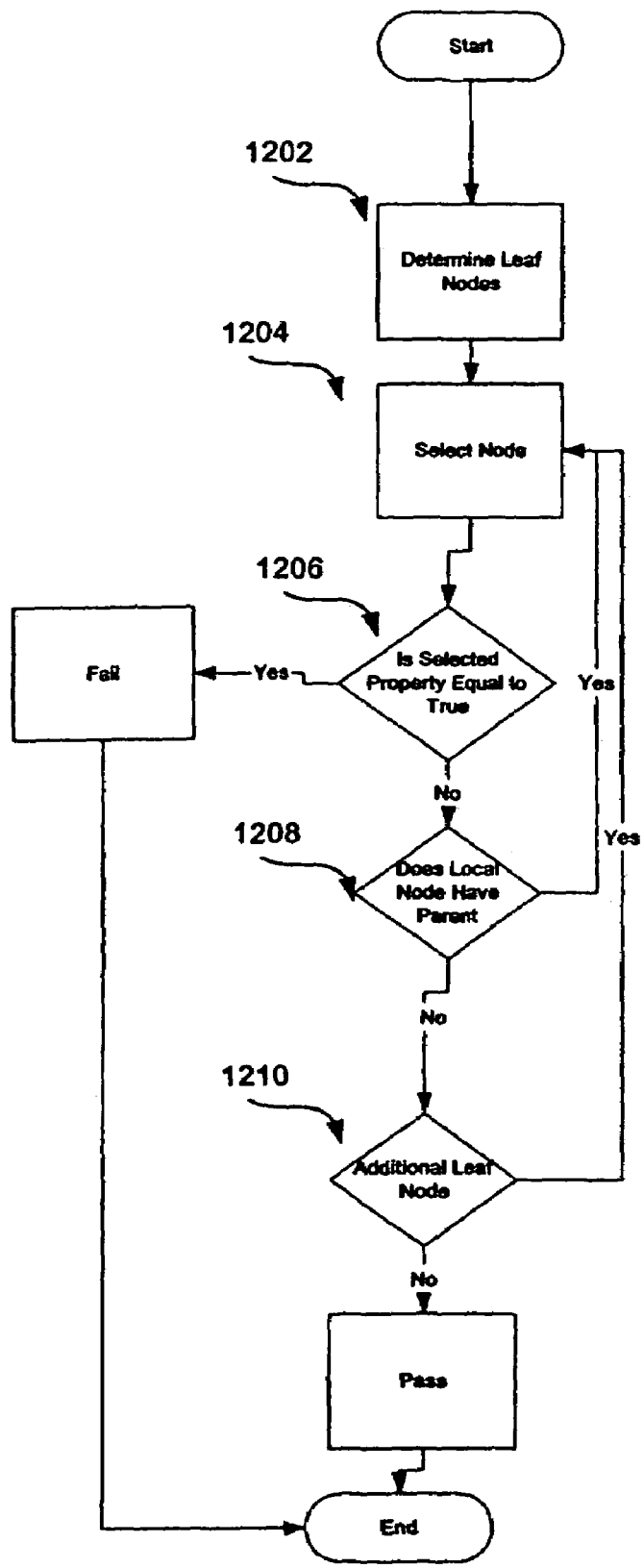
FIG. 14 is a flow chart illustrating another embodiment of a validation process.

FIG. 14 is a flow chart illustrating another embodiment of a validation process that determines if a particular hierarchy has a property value set to True. If the value is "True", the hierarchy fails. According to the embodiment of FIG. 14, the hierarchy management program can determine the leaf nodes for a hierarchy (step 1202) and select a particular leaf node (step 1204). The hierarchy management program can then determine if the selected property is set to "True" (step 1206). If the property is not true, the hierarchy management program can move to the parent local node (step 1208) and again determine if the property is set to "True". When the hierarchy management program reaches the top node in the hierarchy (i.e., when it reaches a local node without a parent), it can determine if there are additional leaf nodes that have not been selected (step 1210) and, if so, select a new leaf node and repeat the process until it either finds the property set to "True" or there are no remaining leaf nodes.

In the examples of FIGS. 13 and 14, the hierarchy management program can compare property values in a particular local node to a criteria. It should be noted that the property value can be accessed from the local node, a corresponding global node or a controlling hierarchy. Additionally, the hierarchy management program can traverse up the hierarchy based on the parents of each node, or down the hierarchy based on the children listed in each node. Table 3 provides an example of validation processes that can implemented by one embodiment of the present invention. According to one embodiment of the present invention, these processes can implemented as defined classes that can be associated with a hierarchy in, for example, a hierarchy object.

TABLE 3

| Class | Description |
| --- | --- |
| BoolNodeInHier | Fails if Bool Prop is true in Hierarchy |
| Contain All Prop | Verifies that a Hierarchy contains all nodes where a specified Property is TRUE |
| ContainAllCC | Verifies that a hierarchy contains all nodes marked as a costcenter with the FCFlag set to false. |
| ContainAllWith | Verifies that a Hierarchy contains all nodes where a specified Property is a specified value |
| Custom Query | Verifies Based on predefined Std Query and expected result |
| Hier Fail | Testing verification |
| Invalid Name Len | Invalid name length |
| Max Children Ver | Verifies that the number of children do not exceed a specified limit |
| MaxHierNodes | Verifies that the number of nodes in a hierarchy does not exceed a specified limit |
| MaxVersionNodes | Verifies that the number of nodes in a version does not exceed a specified limit |
| Merge Equiv | Merge node equivalency validation |
| Merge Prop Set | MergeNode Property Overriden Validate |
| No Bool Branch | Verifies that a boolean property is set to a TRUE value at least once on a branch |
| No Defaults | Verifies that the default values are not used |
| Node Fail Ver | Testing verification |
| NodeFailRandom | Testing verification |
| NoPropBranch | Verifies that a property is set at least once per branch |
| Prop Equiv (CC) | Property equivalency (Cost Centers) |
| Prop Equiv Leaf | Property equivalency (Leaf) |
| Prop Length | Verifies that the property is less than the specified length |
| RequiredField | Verifies that the list of properties have values for nodes that match a set of property checks |
| SingleBoolBranch | Verifies that a boolean property is set to a single TRUE value on a branch |
| SinglePropBranch | Verifies that a property is set only once per branch |
| Stranded Parent | Verifies that all limbs have children |
| String Prop EQ | Property Equals Value |
| UniquePropBranch | Verifies a Unique Property Value within a Branch |
| UniquePropHier | Verifies a Unique Property Value within a Hierarchy |
| Version Fail | Testing verification |
| VerUniqueProp | Verifies a Unique Property within a version |
| VerUnique2Prop | Verifies Unique Properties within a version |

Additionally, the hierarchy management program can include defined processes for exporting data about a particular hierarchy. Table 4 provides several example export classes, according to one embodiment of the present invention. Again the classes of Table 4 are provided by way of example, and are not intended to limit the present invention.

TABLE 4

| Class | Description |
| --- | --- |
| Ancestor | Exports an ancestor list leaf to top node. |
| Generation | Exports an ancestor list from top node down to leaf. |
| Hierarchy Difference Export | Exports differences between two hierarchies |
| Hierarchy Export | Exports the selected hierarchy, the most common type of export |
| Lookup Export | Exports the property lookup table for administration needs |
| Merge Log Export | Exports the merge log, which shows which nodes were merged and to what in the event of a node deletion, rename, or inactive |
| Property List Export | Exports all possible values for list properties |
| Trans Log Export | Exports the application transaction log |
| Version Export | Exports on a version level, including global properties and orphans |

Thus, embodiments of the present invention can apply various business, validation and export rules to hierarchies. It should be noted that when a local node is analyzed, property values can be accessed directly from the local node, from a global node or from other hierarchies so that property values do not have to be redundantly stored.

Figure 15:
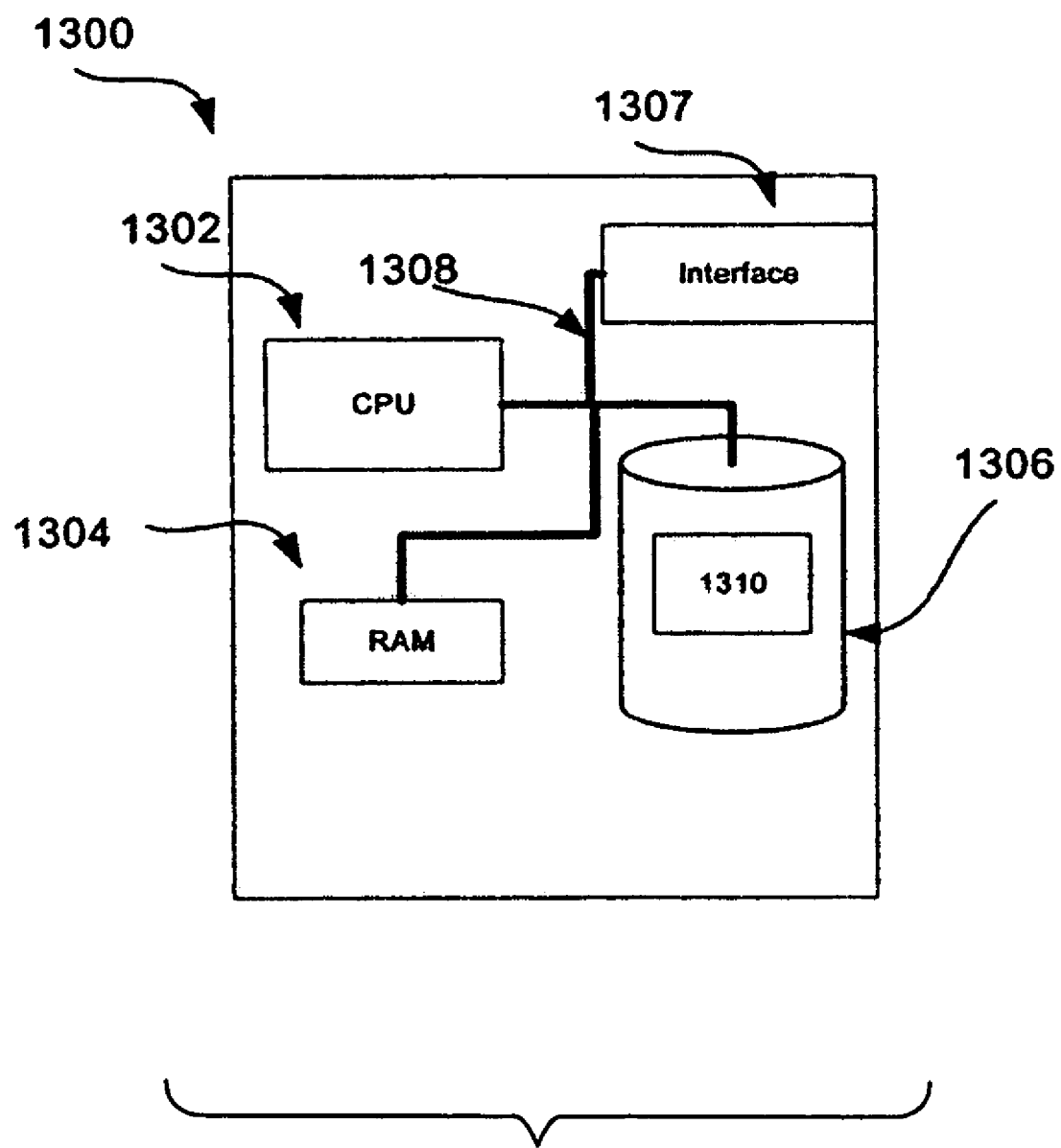
FIG. 15 is a diagrammatic representation of a system for hierarchy management according to one embodiment of the present invention.

FIG. 15 is a diagrammatic representation of one embodiment of a system 1300 or apparatus for implementing the present invention. System 1300 includes a central processing unit ("CPU") 1302, primary storage 1304 (e.g., RAM, flash memory), secondary storage 1306 (e.g., magnetic storage device, optical storage device, RAM, flash memory), a network interface 1307 and a system bus 1308. Secondary storage 1306 includes a set of computer executable instructions (i.e., a hierarchy management program) 1310 executable by CPU 1302. During execution, portions of hierarchy management program 1310 can be resident in primary storage 1304 or secondary storage 1306. System 1300 can include other computer components known in the art, including, but not limited to processors, controllers, input output devices, network interfaces and so on.

In operation, hierarchy management program can maintain a master set of reference data for hierarchies being management in a database (local or remote). Hierarchy management program can access, store and process the master set of reference data according to a hierarchy object model such as that described in conjunction with FIG. 8. According to one embodiment of the present invention, hierarchy management program 1310 can load the master set of reference data from the database into memory (e.g., RAM 1304), and instantiate a version object. From the version object, the hierarchy management program can access hierarchy objects that provide the top node for a particular hierarchy. Based on a hierarchy object, hierarchy management program can identify a top local node. From the top local node in a hierarchy, hierarchy management program can load further global nodes and local nodes for the centralized hierarchy.

System 1300 can communicate with other computers running applications, such as financial applications, reporting applications, ETL programs, and database management programs via a network (e.g., WAN, LAN, the Internet, wireless communication network or other data communication network known in the art). The hierarchical management program can format hierarchies according the requirements of a particular system and publish the hierarchy to that system for use by that system. Thus, embodiments of the present invention provide for centralized management of hierarchical reference data.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A computer program product comprising a set of computer instructions stored on a computer readable storage medium, said set of computer instructions comprising instructions executable to:
   maintain a master set of hierarchical reference data, wherein the master set of hierarchical reference data represents reference data from hierarchies for multiple subscribing systems, said hierarchical reference data comprising reference data for use in enforcing criteria regarding the form in which data in a database is reported to a user, organized to reflect interrelationships between reference data;
   receive a change to a first centralized hierarchy;
   update said first centralized hierarchy based on said change;
   determine additional centralized hierarchies affected by the change;
   update said additional centralized hierarchies affected by the change; and
   apply one or more rules to said first centralized hierarchy and said additional centralized hierarchies to validate the change in the first centralized hierarchy and the additional centralized hierarchies.

2. The computer program product of claim 1, wherein the set of computer instructions further comprise instructions executable to:
   export the first centralized hierarchy and the additional centralized hierarchies to respective subscribing systems if the change is valid for the first centralized hierarchy and the additional centralized hierarchy.

3. The computer program product of the claim 2, wherein the set of computer instructions further comprise instructions executable to:
   update ETL mappings if the change is valid for the first centralized hierarchy and the additional centralized hierarchies.

4. The computer program product of claim 1, wherein the set of computer instructions further comprise instructions executable to import the change from a subscribing system.

5. The computer program product of claim 1, wherein the set of computer instructions further comprise instructions executable to receive the change to the first centralized hierarchy as user input.

6. The computer program product of claim 1, wherein the set of computer instructions further comprise instructions executable to associate permissions with each of the centralized hierarchies.

7. The computer program product of claim 1, wherein a change is validated in a particular hierarchy through application of rules to the hierarchy.

8. The computer program product of claim 1, wherein the set of computer instructions further comprise instructions executable to:
   instantiate centralized hierarchies according to a hierarchy object model, wherein the hierarchy object model further comprises:
   a global node representing a piece of reference data across the multiple centralized hierarchies; and
   at least one local node corresponding to the global node, wherein each local node represents the piece of reference data in a particular centralized hierarchy.

9. The computer program product of claim 8, wherein the global node further comprises a property assigned a global value.

10. The computer program product of claim 8, wherein the at least one local node further comprises a property assigned a local value.

11. The computer program product of claim 10, wherein the property is assigned a first value in a first local node is assigned a second value in a second local node.

12. The computer program product of claim 11, wherein the global node further comprises a property assigned to a property class.

13. The computer program product of claim 11, wherein the property inherits a first value in the first local node from a first ancestor node and inherits a second value in the second local node from a second ancestor node.

14. The computer program product of claim 11, wherein the first local node inherits the first property value from the second local node, wherein the first local node and second local node are associated with different centralized hierarchies.

15. The computer program product of claim 8, wherein the global node includes a list of each local node associated with the global node.

16. The computer program product of claim 15, wherein each local node associated with the global node references the global node.

17. The computer program product of claim 8, wherein the global node further comprises a reference children global nodes.

18. The computer program product of claim 17, wherein each of the local nodes further comprises a reference to a parent local nodes and a reference to children local nodes.

19. A system for managing hierarchical reference data comprising:
   a processor;
   a computer readable storage medium accessible by the processor;
   a set of computer instructions stored on the computer readable storage medium, said set of computer instructions comprising instructions executable to:
   maintain a master set of hierarchical reference data, wherein the master set of hierarchical reference data represents reference data from hierarchies for multiple subscribing systems, said hierarchical reference data comprising reference data for use in enforcing criteria regarding the form in which data in a database is reported to a user, organized to reflect interrelationships between reference data;
   receive a change to a first centralized hierarchy;
   update said first centralized hierarchy based on said change;
   determine additional centralized hierarchies affected by the change;
   update said additional centralized hierarchies affected by the change; and
   apply one or more rules to said first centralized hierarchy and said additional centralized hierarchies to validate the change in the first centralized hierarchy and the additional centralized hierarchies.

20. The system of claim 19, wherein the set of computer instructions further comprise instructions executable to: export the first centralized hierarchy and the additional centralized hierarchies to respective subscribing systems if the change is valid for the first centralized hierarchy and the additional centralized hierarchy.

21. The system of the claim 20, wherein the set of computer instructions further comprise instructions executable to:
update ETL mappings if the change is valid for the first centralized hierarchy and the additional centralized hierarchies.

22. The system of claim 19, wherein the set of computer instructions further comprise instructions executable to import the change from a subscribing system.

23. The system of claim 19, wherein the set of computer instructions further comprise instructions executable to receive the change to the first centralized hierarchy as user input.

24. The system of claim 19, wherein the set of computer instructions further comprise instructions executable to associate permissions with each of the centralized hierarchies.

25. The system of claim 19, wherein a change is validated in a particular hierarchy through application of rules to the hierarchy.

26. The system of claim 19, wherein the set of computer instructions further comprise instructions executable to:
instantiate centralized hierarchies according to a hierarchy object model, wherein the hierarchy object model further comprises:
a global node representing a piece of reference data across the multiple centralized hierarchies; and
at least one local node corresponding to the global node, wherein each local node represents the piece of reference data in a particular centralized hierarchy.

27. The system of claim 26, wherein the global node further comprises a property assigned a global value.

28. The system of claim 26, wherein the at least one local node further comprises a property assigned a local value.

29. The system of claim 28, wherein the property is assigned a first value in a first local node is assigned a second value in a second local node.

30. The system of claim 29, wherein the global node further comprises a property assigned to a property class.

31. The system of claim 29, wherein the first property inherits a first value in the first local node from a first ancestor node and inherits a second value in the second local node from a second ancestor node.

32. The system of claim 29, wherein the first local node inherits the first property value from the second local node, wherein the first local node and second local node are associated with different centralized hierarchies.

33. The system of claim 26, wherein the global node includes a list of each local node associated with the global node.

34. The system of claim 33, wherein each local node associated with the global node references the global node.

35. The system of claim 26, wherein the global node further comprises a reference children global nodes.

36. The system of claim 35, wherein each of the local nodes further comprises a reference to a parent local nodes and a reference to children local nodes.

37. A method of managing in multiple hierarchies of reference data comprising:
maintaining a master set of hierarchical reference data, wherein the master set of hierarchical reference data represents reference data from hierarchies for multiple subscribing systems, said hierarchical reference data comprising reference data for use in enforcing criteria regarding the form in which data in a database is reported to a user, organized to reflect interrelationships between reference data;
receiving a change to a first centralized hierarchy;
updating said first centralized hierarchy based on said change;
determining additional centralized hierarchies affected by the change;
updating said additional centralized hierarchies affected by the change; and
applying one or more rules to said first centralized hierarchy and said additional centralized hierarchies to validate the change in the first centralized hierarchy and the additional centralized hierarchies.

38. The method of claim 37, further comprising exporting the first centralized hierarchy and the additional centralized hierarchies to respective subscribing systems if the change is valid for the first centralized hierarchy and the additional centralized hierarchy.

39. The method of claim 38, further comprising updating ETL mappings if the change is valid for the first centralized hierarchy and the additional centralized hierarchies.

40. The method of claim 37, further comprising importing the change from a subscribing system.

41. The method of claim 37, further comprising associating permissions with each of the centralized hierarchies.

42. The method of claim 37, wherein a change is validated in a particular hierarchy through application of rules to the hierarchy.

43. The method of claim 37, wherein the set of computer instructions further comprise instructions executable to:
instantiating centralized hierarchies according to a hierarchy object model, wherein the hierarchy object model further comprises:
a global node representing a piece of reference data across the multiple centralized hierarchies; and
at least one local node corresponding to the global node, wherein each local node represents the piece of reference data in a particular centralized hierarchy.

44. An apparatus for managing in multiple hierarchies of reference data comprising:
means for maintaining a master set of hierarchical reference data, wherein the master set of hierarchical reference data represents reference data from hierarchies for multiple subscribing systems, said hierarchical reference data comprising reference data for use in enforcing criteria regarding the form in which data in a database is reported to a user, organized to reflect interrelationships between reference data;
means for receiving a change to a first centralized hierarchy;
means for updating said first centralized hierarchy based on said change;
means for determining additional centralized hierarchies affected by the change;
means for updating said additional centralized hierarchies affected by the change; and
means for applying one or more rules to said first centralized hierarchy and said additional centralized hierarchies to validate the change in the first centralized hierarchy and the additional centralized hierarchies.

45. The apparatus of claim 44, further comprising means for exporting the first centralized hierarchy and the additional centralized hierarchies to respective subscribing systems if the change is valid for the first centralized hierarchy and the additional centralized hierarchy.

46. The apparatus of claim 45, further comprising means for updating ETL mappings if the change is valid for the first centralized hierarchy and the additional centralized hierarchies.

47. The apparatus of claim 44, further comprising means for importing the change from a subscribing system.

48. The apparatus of claim 44, further comprising means for associating permissions with each of the centralized hierarchies.

49. The apparatus of claim 44, wherein a change is validated in a particular hierarchy through application of rules to the hierarchy.

50. The apparatus of claim 44, wherein the set of computer instructions further comprise instructions executable to:

instantiating centralized hierarchies according to a hierarchy object model, wherein the hierarchy object model further comprises:

a global node representing a piece of reference data across the multiple centralized hierarchies; and at least one local node corresponding to the global node, wherein each local node represents the piece of reference data in a particular centralized hierarchy.

\* \* \* \* \*

UNITED STATES PATENT AND TRADEMARK OFFICE
CERTIFICATE OF CORRECTION

| | | |
|---|---|---|
| PATENT NO. | : 7,305,419 B1 | Page 1 of 1 |
| APPLICATION NO. | : 10/809056 | |
| DATED | : December 4, 2007 | |
| INVENTOR(S) | : Cosby et al. | |

It is certified that error appears in the above-identified patent and that said Letters Patent is hereby corrected as shown below:

On sheet 8 of 19, in Fig. 6, (in Reference Numeral 534), line 1, delete "Changeto" and insert -- Change to --, therefor.

On sheet 9 of 19, in Fig. 7, (Left of Reference Numeral 556), line 2, delete "Adminstration" and insert -- Administration --, therefor.

On sheet 12 of 19, in Fig. 10, (in Reference Numeral 832), line 2, delete "Globa" and insert -- Global --, therefor.

On sheet 12 of 19, in Fig. 10, (in Reference Numeral 816), line 2, delete "Globa" and insert -- Global --, therefor.

On sheet 15 of 19, in Fig. 12B, (in Reference Numeral 1004), line 3, delete "Attrbute" and insert -- Attribute --, therefor.

On sheet 15 of 19, in Fig. 12B, (in Reference Numeral 1008), line 3, delete "Attrbute" and insert -- Attribute --, therefor.

In column 8, line 27, delete "51b," and insert -- 510, --, therefor.

In column 14, line 40, delete "AnscestorProp" and insert -- AncestorProp --, therefor.

In column 14, line 45, delete "AnscestorProp" and insert -- AncestorProp --, therefor.

In column 22, line 13, delete "an" and insert -- a --, therefor.

Signed and Sealed this

Second Day of September, 2008

JON W. DUDAS
*Director of the United States Patent and Trademark Office*